(12) United States Patent
Altaparmakov et al.

(10) Patent No.: US 10,838,913 B2
(45) Date of Patent: Nov. 17, 2020

(54) SYSTEMS AND METHODS FOR STORING LARGE FILES USING FILE ALLOCATION TABLE BASED FILE SYSTEMS

(71) Applicant: Tuxera Inc., Espoo (FI)

(72) Inventors: Anton Ivanov Altaparmakov, Great Chesterford (GB); Karl Erik Larsson, Stockholm (SE)

(73) Assignee: Tuxera, Inc., Espoo (FI)

( * ) Notice: Subject to any disclaimer, the term of this patent is extended or adjusted under 35 U.S.C. 154(b) by 292 days.

(21) Appl. No.: 15/809,452

(22) Filed: Nov. 10, 2017

(65) Prior Publication Data

US 2018/0137136 A1 May 17, 2018

Related U.S. Application Data

(60) Provisional application No. 62/421,666, filed on Nov. 14, 2016, provisional application No. 62/430,446, filed on Dec. 6, 2016, provisional application No. 62/544,287, filed on Aug. 11, 2017.

(51) Int. Cl.
*G06F 16/00* (2019.01)
*G06F 16/13* (2019.01)
*G06F 16/901* (2019.01)
*G06F 3/06* (2006.01)

(52) U.S. Cl.
CPC ............ *G06F 16/13* (2019.01); *G06F 3/0643* (2013.01); *G06F 3/0667* (2013.01); *G06F 16/9017* (2019.01)

(58) Field of Classification Search
CPC .... G06F 16/13; G06F 16/9017; G06F 3/0643; G06F 3/0667
See application file for complete search history.

(56) References Cited

U.S. PATENT DOCUMENTS

| | | | |
|---|---|---|---|
| 5,367,671 A | 11/1994 | Feigenbaum et al. | |
| 5,689,701 A * | 11/1997 | Ault | G06F 16/13 |
| 6,094,706 A | 7/2000 | Factor et al. | |
| 6,286,013 B1 * | 9/2001 | Reynolds | G06F 16/166 |
| | | | 719/328 |
| 6,343,294 B1 * | 1/2002 | Hawley | G06F 16/10 |
| 6,377,958 B1 | 4/2002 | Orcutt | |
| 6,615,365 B1 | 9/2003 | Jenevein et al. | |
| 6,625,591 B1 | 9/2003 | Vahalia et al. | |
| 6,976,053 B1 * | 12/2005 | Tripp et al. | G06F 16/951 |
| | | | 709/202 |
| 7,809,779 B2 | 10/2010 | Ahn et al. | |

(Continued)

OTHER PUBLICATIONS

International Search Report and Written Opinion for PCT/US2017/061257 dated Mar. 9, 2018, pp. 19.

(Continued)

*Primary Examiner* — Leslie Wong
(74) *Attorney, Agent, or Firm* — J. Fish Law, PLLC

(57) ABSTRACT

This disclosure describes techniques for storing large files to file system volumes. In some examples, this disclosure describes techniques for storing files larger than a maximum file size allowed for File Allocation Table (FAT) file systems to a volume formatted according to a FAT file system. This disclosure describes techniques for handling calls associated with large files. In this manner, the techniques described here may support larger file sizes while being backwards compatible.

21 Claims, 16 Drawing Sheets

(56) References Cited

U.S. PATENT DOCUMENTS

| | | | |
|---|---|---|---|
| 7,814,554 B1* | 10/2010 | Ragner | G06F 21/52 713/165 |
| 7,970,804 B2 | 6/2011 | Tang et al. | |
| 8,423,743 B2 | 4/2013 | Lee | |
| 8,438,196 B1* | 5/2013 | Cook | G06F 16/13 707/825 |
| 8,583,708 B2 | 11/2013 | Pudipeddi et al. | |
| 9,575,972 B2 | 2/2017 | Pudipeddi et al. | |
| 2002/0092003 A1 | 7/2002 | Calder et al. | |
| 2003/0172230 A1* | 9/2003 | Sasaki | G11B 20/10 711/112 |
| 2006/0265426 A1 | 11/2006 | Chen | |
| 2007/0116219 A1* | 5/2007 | Nasiri et al. | H04M 3/4931 379/142.01 |
| 2007/0180509 A1* | 8/2007 | Swartz et al. | G06F 9/4406 726/9 |
| 2008/0195797 A1* | 8/2008 | Sherman | G06F 3/0623 711/103 |
| 2010/0228795 A1 | 9/2010 | Hahn et al. | |
| 2011/0060773 A1 | 3/2011 | Itoh | |
| 2013/0290383 A1* | 10/2013 | Nitin | G06F 16/137 707/822 |
| 2013/0312087 A1* | 11/2013 | Latzina | G06F 21/00 726/19 |
| 2014/0095458 A1 | 4/2014 | Kim et al. | |
| 2014/0122424 A1* | 5/2014 | Barnes | G06F 16/13 707/610 |
| 2014/0181041 A1* | 6/2014 | Whitehead | G06F 11/1448 707/652 |
| 2014/0201151 A1* | 7/2014 | Kumarasamy | G06F 11/1469 707/646 |
| 2015/0193460 A1 | 7/2015 | Altaparmakov et al. | |
| 2015/0234885 A1* | 8/2015 | Weinstein | G06F 16/152 707/690 |
| 2016/0321287 A1 | 11/2016 | Luthra et al. | |
| 2017/0324755 A1* | 11/2017 | Dekel | H04L 63/145 |

OTHER PUBLICATIONS

Microsoft Corporation—Hardware White Paper (Version 1.03, Dec. 6, 2000)(Year: 2000), pp. 35.

Search Opinion and Report, EP Application No. 17869693.6, dated Apr. 10, 2020, pp. 13.

Beland: "Directory (computing)—Wikipedia", Oct. 21, 2016. Retrieved from URL: https://en.wikipedia.org/w/index.php?title=Directory_(computing)&oldid-745531912 on Aug. 7, 2020, XP055720919 p. 3.

Search Opinion and Report, EP Application No. 17869693.6, dated Aug. 17, 2020, p. 13.

* cited by examiner

| DIRECTORY ENTRY RECORD 402 | BYTE 0-10 | BYTE 11 | BYTE 12 | BYTE 13-19 | BYTE 20-21 | BYTE 22-25 | BYTE 26-27 | BYTE 28-31 |
|---|---|---|---|---|---|---|---|---|
| | NAME | DOS FILE FLAGS | DOS NAME FLAGS | TIME DATA | FAT12/16: ALWAYS 0 FAT32: HIGH 16-BITS OF FIRST CLUSTER | TIME DATA | LOW 16-BITS OF FIRST CLUSTER | FILE SIZE |

| LONG NAME DIRECTORY ENTRY RECORD(S) 404 | BYTE 0 | BYTE 1-10 | BYTE 11 | BYTE 12 | BYTE 13 | BYTE 14-25 | BYTE 26-27 | BYTE 28-31 |
|---|---|---|---|---|---|---|---|---|
| | ORDINAL | LONGNAME CHAR 1-5 | DOS FILE FLAGS | ZERO | CHECKSUM OF NAME | LONGNAME CHAR 6-11 | ZERO | LONGNAME CHAR 12-13 |

| DIRECTORY TABLE |
|---|
| ROOT<br>    VACATIONS<br>        .<br>        ..<br>        PIC_A.JPG<br>        MYMOVIE.MP4<br>            .<br>            ..<br>            A$FT$LGE.F$L<br>            F$200000.000<br>            S$005000.000<br>            U$0000<br>            U$0001<br>            U$0002 |

FIG. 7

SYSTEMS AND METHODS FOR STORING LARGE FILES USING FILE ALLOCATION TABLE BASED FILE SYSTEMS

RELATED APPLICATIONS

This application claims the benefit of U.S. Provisional Application No. 62/421,666, filed on Nov. 14, 2016, U.S. Provisional Application No. 62/430,446, filed on Dec. 6, 2016, and U.S. Provisional Application No. 62/544,287, filed on Aug. 11, 2017, each of which are incorporated by reference in their entirety.

TECHNICAL FIELD

This disclosure relates to systems and methods for use with file systems and more particularly to techniques for storing large files using file allocation table based file systems.

BACKGROUND

Devices including laptop or desktop computers, tablet computers, televisions, digital video recorders, set-top boxes, digital media players, video gaming devices, and cellular telephones may utilize file systems to control how data is stored on and retrieved from a computer readable medium. For example, a device may read and/or write data to a storage device, such as, a memory card (e.g., a Secure Digital (SD) memory card, including Standard-Capacity (SDSC), High-Capacity (SDHC), and eXtended-Capacity (SDXC) formats, a MultiMediaCard (MMC) including embedded MMC (eMMC), and a Universal Flash Storage (UFS) card), a hard disk drive, and/or a solid state drive including a Universal Serial Bus (USB) solid state drive (so-called "flash," "thumb," or "jump" drives) according to a defined file system. Types of file systems include, for example, file systems based on the Extended File System (ext), file systems based on the Hierarchical File System (HFS), file systems based on the XFS file system, file systems based on the Z File System (ZFS), file systems based on the New Technology File System (NTFS), and file systems based on File Allocation Table (FAT) file systems, including the FAT12, FAT16, FAT32, exFAT, and transactional exFAT file systems. Respective data objects (e.g., files) may be stored to a storage device within a volume. File systems may specify a maximum file size. Current maximum file sizes allowed for some file systems may be less than ideal.

SUMMARY

In general, this disclosure describes techniques for storing large files to File Allocation Table (FAT) based file system volumes. In particular, this disclosure describes techniques for storing files larger than a maximum file size allowed for File Allocation Table (FAT) file systems to a volume formatted according to a FAT file system. In this manner, the techniques described herein may support larger file sizes while maintaining backwards compatibility with a FAT file system. It should be noted that incorporation by reference of documents herein is for descriptive purposes and should not be construed to limit and/or create ambiguity with respect to terms used herein. For example, in the case where one incorporated reference provides a different definition of a term than another incorporated reference and/or as the term is used herein, the term should be interpreted in a manner that broadly includes each respective definition and/or in a manner that includes each of the particular definitions in the alternative.

According to one example of the disclosure, a method for writing a file to a volume comprises writing a directory entry including a directory representation for the file and writing one or more directory entries within the directory including names having characters indicating properties of the file.

According to another example of the disclosure, a device comprises one or more processors configured to write a directory entry including a directory representation for the file and write one or more directory entries within the directory including names having characters indicating properties of the file.

According to another example of the disclosure, a non-transitory computer-readable storage medium comprises instructions stored thereon, that upon execution, cause one or more processors of a device to write a directory entry including a directory representation for the file and write one or more directory entries within the directory including names having characters indicating properties of the file.

According to another example of the disclosure, an apparatus comprises means for writing a directory entry including a directory representation for the file and means for writing one or more directory entries within the directory including names having characters indicating properties of the file.

According to one example of the disclosure, a method for reading a file from a volume comprises determining whether a directory entry indicates that the directory entry is a directory representation for a file, determining whether one or more directory entries within the directory include names having characters indicating properties of the file, and reading the file based on the values of the characters.

According to another example of the disclosure, a device comprises one or more processors configured to determine whether a directory entry indicates that the directory entry is a directory representation for a file, determine whether one or more directory entries within the directory include names having characters indicating properties of the file, and read the file based on the values of the characters.

According to another example of the disclosure, a non-transitory computer-readable storage medium comprises instructions stored thereon, that upon execution, cause one or more processors of a device to determine whether a directory entry indicates that the directory entry is a directory representation for a file, determine whether one or more directory entries within the directory include names having characters indicating properties of the file, and read the file based on the values of the characters.

According to another example of the disclosure, an apparatus comprises means for determining whether a directory entry indicates that the directory entry is a directory representation for a file, means for determining whether one or more directory entries within the directory include names having characters indicating properties of the file, and means for reading the file based on the values of the characters.

According to one example of the disclosure, a method for handling calls for a directory representation for a file comprises invoking a virtual file object for the file, invoking a respective data structure for each of a plurality of sub-files included in the directory, receiving a call associated with the virtual file object, and remapping the call to one of the respective data structures.

According to another example of the disclosure, a device comprises one or more processors configured to invoke a virtual file object for the file, invoke a respective data structure for each of a plurality of sub-files included in the directory, receive a call associated with the virtual file object, and remap the call to one of the respective data structures.

According to another example of the disclosure, a non-transitory computer-readable storage medium comprises instructions stored thereon, that upon execution, cause one or more processors of a device to invoke a virtual file object for the file, invoke a respective data structure for each of a plurality of sub-files included in the directory, receive a call associated with the virtual file object, and remap the call to one of the respective data structures.

According to another example of the disclosure, an apparatus comprises means for invoking a virtual file object for the file, means for invoking a respective data structure for each of a plurality of sub-files included in the directory, means for receiving a call associated with the virtual file object, and remapping the call to one of the respective data structures.

According to one example of the disclosure, a method for handling calls for a directory representation for a file comprises invoking a virtual file object for the file, invoking a respective data structure for each of a plurality of sub-files included in the directory, receiving a call associated with the virtual file object, and translating the call to one of the respective data structures.

According to another example of the disclosure, a device comprises one or more processors configured to invoke a virtual file object for the file, invoke a respective data structure for each of a plurality of sub-files included in the directory, receive a call associated with the virtual file object, and translate the call to one of the respective data structures.

According to another example of the disclosure, a non-transitory computer-readable storage medium comprises instructions stored thereon, that upon execution, cause one or more processors of a device to invoke a virtual file object for the file, invoke a respective data structure for each of a plurality of sub-files included in the directory, receive a call associated with the virtual file object, and translate the call to one of the respective data structures.

According to another example of the disclosure, an apparatus comprises means for invoking a virtual file object for the file, means for invoking a respective data structure for each of a plurality of sub-files included in the directory, means for receiving a call associated with the virtual file object, and means for translating the call to one of the respective data structures.

According to one example of the disclosure, a method for handling calls for a directory representation for a file comprises invoking a virtual file object for the file, invoking data structures for the virtual file object without invoking a respective data structure for each of a plurality of sub-files included in the directory, receiving a call associated with the virtual file object, and handling the call.

According to another example of the disclosure, a device comprises one or more processors configured to invoke a virtual file object for the file, invoke data structures for the virtual file object without invoking a respective data structure for each of a plurality of sub-files included in the directory, receive a call associated with the virtual file object, and handle the call.

According to another example of the disclosure, a non-transitory computer-readable storage medium comprises instructions stored thereon, that upon execution, cause one or more processors of a device to invoke a virtual file object for the file, invoke data structures for the virtual file object without invoking a respective data structure for each of a plurality of sub-files included in the directory, receive a call associated with the virtual file object, and handle the call.

According to another example of the disclosure, an apparatus comprises means for invoking a virtual file object for the file, means for invoking data structures for the virtual file object without invoking a respective data structure for each of a plurality of sub-files included in the directory, means for receiving a call associated with the virtual file object, and means for handling the call.

The details of one or more examples are set forth in the accompanying drawings and the description below. Other features, objects, and advantages will be apparent from the description and drawings, and from the claims.

BRIEF DESCRIPTION OF DRAWINGS

FIG. 4 is a conceptual diagram illustrating examples of directory entry record formats according to one or more techniques of this disclosure.

FIGS. 6A-6B are conceptual diagrams illustrating examples of a directory entries associated with a large file according to one or more techniques of this disclosure.

FIG. 7 is a conceptual diagram illustrating an example of directory entries included in directory table according to one or more techniques of this disclosure.

DETAILED DESCRIPTION

Figure 1:
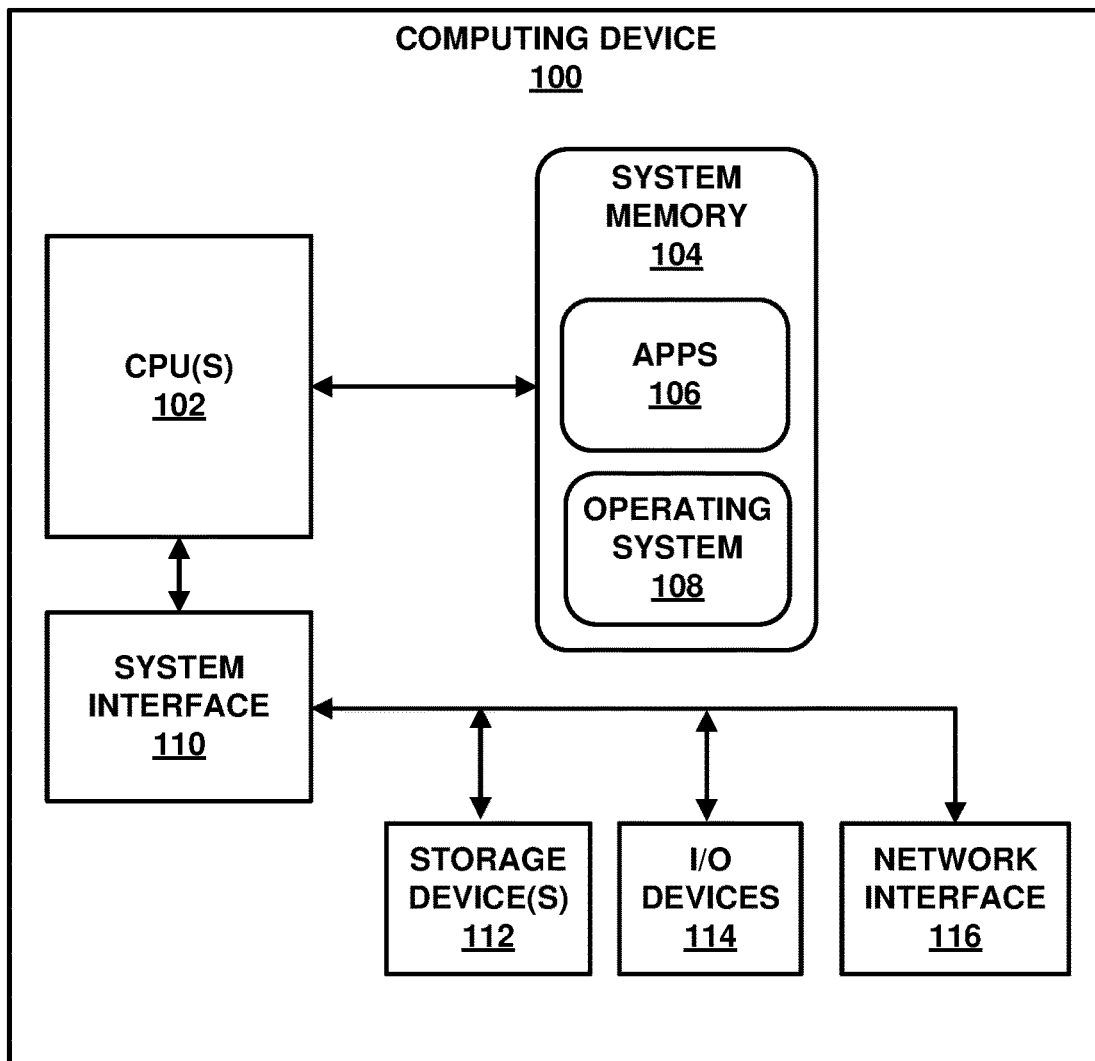
FIG. 1 is a block diagram illustrating an example of a computing device that may implement one or more techniques of this disclosure.

User data may be arranged, organized, and/or managed on a storage device according to a defined file system. A file system may specify the structure and requirements of a volume, where a volume is a set of logical structures defined for a data space necessary to store and retrieve user data. A volume may include boot record(s), file allocation table(s), other data structures (e.g., allocation bitmaps and journals), and user data. User data may include directories and files, and/or similar data structures. Each of a directory, file, and/or similar data structures may generally be referred to as a data object or data item. In Unix based file systems, the term Mode may be used to refer to a file or a directory data object. As used herein, the term Mode may more generally refer to a data object associated with user data. User data may be physically stored to one or more sectors of a storage device. File systems may define a cluster (or allocation unit) according to a number of sectors, where a cluster is the smallest logical unit of memory that can be allocated to a data object. Thus, one or more clusters are allocated to each data object stored on a storage device. File allocation table(s), allocation bitmap(s), and/or similar logical structures within a file system provide a mapping of data objects to one or more allocated clusters, and as such may be referred to as allocation mapping structures. As described in further detail below, file system drivers may allow an application and/or processes associated with an application to cause data objects to be modified on a storage device.

Examples of file systems include the so-called (FAT) file systems (e.g., FAT12, FAT16, and FAT32.) The FAT32 file system is described in the Microsoft Extensible Firmware Initiative FAT32 File System Specification (version 1.03 Dec. 6, 2000), which is incorporated by reference in its entirety. A file system may support a maximum file size. For example, as described in further detail below, the FAT32 file system includes a four byte file size field in a directory entry and thus supports a maximum file size of $2^{32}$ (4,294,967, 296) bytes (i.e., 4 GiB)). A maximum file size of 4 GiB may be insufficient for some applications (e.g., high quality video recording). The FAT32 file system is a useful file system that is widely supported by various operating systems and as such, it may be useful to enable support of larger maximum file sizes while utilizing the FAT32 file system. It should be noted that the exFAT file system, which is described in Microsoft exFAT Revision 1.00 File System Basic Specification (fourth release, 1 Jan. 2009), supports a maximum file system that is larger than 4 GiB. However, the exFAT file system is not backwards compatible with FAT drivers and requires exFAT specific formatting and repair tools. Further, it should be noted that there have been efforts to support larger file sizes in FAT file systems by setting particular values for reserved or unused bits. These efforts are less than ideal, as drivers and other tools may inadvertently (or intentionally) modify the bits, thereby corrupting the larger files and as such are not backwards compatible with FAT32. Further, FAT drivers and other tools may truncate FAT chains that are longer than 4 GiB.

This disclosure provides techniques for allowing files larger than 4 GiB to be stored on a FAT volume, e.g., a FAT32 volume. The example techniques described herein allow files larger than 4 GiB to be stored on a FAT32 volume and are backwards compatible with legacy FAT32 drives and formatting and repair tools. That is, except for such large files, the remainder of the volume is still accessible by a standard FAT32 driver. As described in further detail below, files larger than 4 GiB are implemented as directories with particular types of directory entries within the directory, where the particular types of directory entries provide information associated with the large file. Thus, a legacy FAT32 drivers and tools would see the large files as directories and a regular FAT32 driver can still rename and/or delete large files by renaming and/or deleting the directory of the same name. Further, as described in detail below, a file system driver and/or an application operating on top of a FAT32 driver may be configured to read and write files larger than 4 GiB by parsing the directory representing the large file and the particular types of directory entries within the directory.

FIG. 1 is a block diagram illustrating an example of a computing device that may implement one or more techniques of this disclosure. Computing device 100 may include one or more processors and a plurality of internal and/or external storage devices. Examples of storage devices include file servers, File Transfer Protocol (FTP) servers, network attached storage (NAS) devices, a local disk drive, removable memory devices, such as, for example, memory cards and USB memory devices, or any other type of device or storage medium capable of storing data. A storage medium may include an optical storage medium (e.g., DVDs, CD-ROMs, etc.), a magnetic storage medium, a flash memory, or any other suitable digital storage media. When the techniques described herein are implemented partially in software, a device may store instructions for the software in a suitable, non-transitory computer-readable medium and execute the instructions in hardware using one or more processors.

Computing device 100 is an example a computing device configured to store data on or retrieve data from a computer readable medium. Data may include, for example, application files, document files, media files (audio and/or video files), and the like. Computing device 100 may be equipped for wired and/or wireless communications and may include devices, such as, for example, desktop or laptop computers, mobile devices, smartphones, cellular telephones, tablet devices, set top boxes, DVRs, surveillance systems, personal gaming devices, drones, and automotive infotainment systems. As illustrated in FIG. 1, computing device 100 includes central processor unit(s) 102, system memory 104, system interface 110, storage device(s) 112, input/output (I/O) device(s) 114, and network interface 116. As illustrated in FIG. 1, system memory 104 includes applications (apps) 106 and operating system 108. It should be noted that applications and functions associated therewith may be generally referred to as a user-space. It should be noted that although example computing device 100 is illustrated as having distinct functional blocks, such an illustration is for descriptive purposes and does not limit computing device 100 to a particular hardware or software architecture. Functions of computing device 100 may be realized using any combination of hardware, firmware and/or software implementations.

Central processing unit(s) 102 may be configured to implement functionality and/or process instructions for execution in computing device 100. Central processing unit(s) 102 may be capable of retrieving and processing instructions, code, and/or data structures for implementing one or more of the techniques described herein. Instructions may be stored on a computer readable medium, such as system memory 104 or storage device(s) 112. Central processing unit(s) 102 may include digital signal processors (DSPs), general purpose microprocessors, application specific integrated circuits (ASICs), field programmable logic arrays (FPGAs), or other equivalent integrated or discrete logic circuitry. Central processing unit(s) 102 may include one or more multi-core central processing units. Central processing unit(s) 102 may operate according to a page size, where a page includes a fixed-length contiguous block of virtual memory. A common page size for central processing unit architectures is 4096 bytes (i.e., 4 kilobytes (kiB)). Other example page sizes may include 8 kiB, 16 kiB, 32 kiB, 64 kiB, etc.

A page may store data corresponding to a defined data structure. For example, as described in further detail below, a page may store data corresponding to an instance of an Mode object structure. Further, a page may store data corresponding to physical blocks on a storage device. Pages storing data corresponding to physical blocks on a storage device are included in a page cache. Pages in a page cache may include blocks, where a block may represent one or more sectors of a storage device. The number of bytes per sector may be based on a storage device type, where a sector represents the smallest addressable unit of a storage device. For example, a common sector size is 512 bytes for hard disk drives and CD-ROM discs have sectors of 2048 bytes. Thus, in one example, a 4 kiB page in a page cache may include four blocks, where each block represents two 512 bytes sectors on a storage device. It should be noted that for flash memory based storage devices, the term block may refer to the smallest unit of data that may be erased (i.e., an erase block). For flash memory based storage devices, an erase block includes a number of pages, where a page in the context of a flash memory device refers to the smallest unit of data that can be written to. Typically, in a flash memory based storage device, pages need to be erased before they can be written to. Typical block and page sizes for a flash memory based storage devices are respectively 4-8 MB (2^20 bytes) and 8-16 kiBs. As used herein, the term sector may include a page of a flash memory device.

System memory 104 may be configured to store information that may be used by computing device 100 during operation. System memory 104 may be described as a non-transitory or tangible computer-readable storage medium. In some examples, system memory 104 may provide temporary memory and/or long-term storage. In some examples, system memory 104 or portions thereof may be described as non-volatile memory and in other examples portions of system memory may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories. In one example, system memory 104 may include an internal hard disk drive and/or an internal flash memory.

System interface 110 may be configured to enable communications between components of computing device 100. In one example, system interface 110 comprises structures that enable data to be transferred from one peer device to another peer device or to a storage medium. For example, system interface 110 may include a chipset supporting Peripheral Component Interconnect (PCI), Peripheral Component Interconnect Express (PCIe) bus protocols, proprietary bus protocols, or any other form of structure that may be used to interconnect peer devices.

Storage device(s) 112 represent memory of computing device 100 that may be configured to store different amounts of information for different periods of time than system memory 104. Similar to system memory 104, storage device(s) 112 may also include one or more non-transitory or tangible computer-readable storage media. Storage device(s) 112 may be internal or external memory and in some examples may include non-volatile storage elements. Storage device(s) may include memory cards (e.g., a Secure Digital (SD) memory card, including Standard-Capacity (SDSC), High-Capacity (SDHC), and eXtended-Capacity (SDXC) formats, a MultiMediaCard (MMC) including embedded MMC (eMMC), and a Universal Flash Storage (UFS) card), external hard disk drives, and/or an external solid state drive. Data stored on storage device(s) 112 may be stored according to a defined file system, such as, for example FAT12, FAT16, FAT32 and/or proprietary file systems, including file systems based on the techniques described herein.

I/O device(s) 114 may be configured to receive input and provide output for computing device 100. Input may be generated from an input device, such as, for example, a touch-sensitive screen, a track pad, a track point, a mouse, a keyboard, a microphone, one or more video cameras, or any other type of device configured to receive input. Output may be provided to output devices, such as, for example, speakers or a display device. In some examples, I/O device(s) 114 may be external to computing device 100 and may be operatively coupled to computing device 100 using a standardized communication protocol, such as for example, Universal Serial Bus protocol (USB).

Network interface 116 may be configured to enable computing device 100 to communicate with external computing devices via one or more networks. Network interface 116 may be a network interface card, such as an Ethernet card, an optical transceiver, a radio frequency transceiver, or any other type of device that can send and receive information. Network interface 116 may be configured to operate according to one or more communication protocols such as, for example, a Global System Mobile Communications (GSM) standard, a code division multiple access (CDMA) standard, a 3rd Generation Partnership Project (3GPP) standard, an Internet Protocol (IP) standard, a Wireless Application Protocol (WAP) standard, and/or an IEEE standard, such as, one or more of the 802.11 standards, as well as various combinations thereof.

As illustrated in FIG. 1, system memory 104 includes applications 106 and operating system 108. Applications 106 may include any applications implemented within or executed by computing device 100 and may be implemented or contained within, operable by, executed by, and/or be operatively/communicatively coupled to components of computing device 100. Applications 106 may include instructions that may cause central processing unit(s) 102 of computing device 100 to perform particular functions. Applications 106 may cause central processing unit(s) 102 to write data to or read data from a computer readable medium, such as for example, system memory 104 and/or storage device(s) 112. Applications 106 may include algorithms which are expressed in computer programming statements, such as, for loops, while-loops, if-statements, do-loops, etc.

As further illustrated in FIG. 1, applications 106 may execute on top of operating system 108. Operating system 108 may be configured to facilitate the interaction of applications 106 with central processing unit(s) 102, and other hardware components of computing device 100. Operating system 108 may be an operating system designed to be installed on laptops and desktops. For example, operating system 108 may be a Windows® operating system, Linux, or Mac OS. Operating system 108 may be an operating system designed to be installed on smartphones, tablets, set-top boxes, and/or gaming devices. For example, operating system 108 may be a Windows®, Linux, Mac OS, Android, iOS, Windows Mobile®, or a Windows Phone® operating system. It should be noted that although techniques may be described according to particular example operating systems, the techniques described herein are not limited to a particular operating system.

Figure 2:
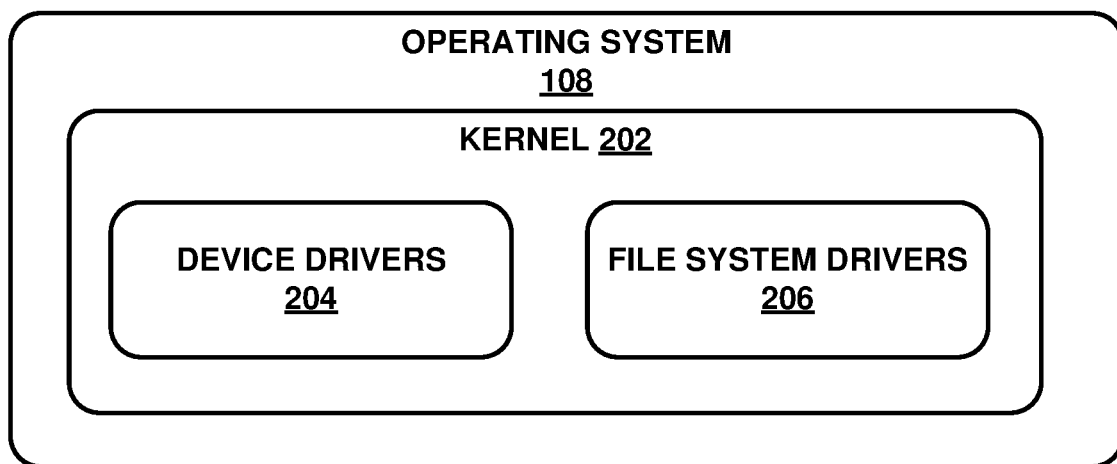
FIG. 2 is a block diagram illustrating an example of an operating system of a computing device that may implement one or more techniques of this disclosure.

FIG. 2 is a block diagram illustrating an example of an operating system of a computing device that may implement one or more techniques of this disclosure. As illustrated in FIG. 2, operating system 108 includes kernel 202. In one example, kernel 202 may be a kernel based on a Linux kernel. In other examples, kernel 202 may be a component or subset of instructions of an operating system. As illustrated in FIG. 2, kernel includes device drivers 204 and file system drivers 206. Device drivers 204 may be configured to operate as an interface between operating system 108 and hardware devices, such as, for example, system interface 110. File system drivers 206 may be configured to provide a layer of abstraction between applications 106 and/or operating system 108 and a storage device, such as, for example system memory 104 and/or storage device(s) 112. For example, file system drivers 206 may allow an application to modify a data object (e.g., in response to user input) on storage device(s) 112 without requiring the application to perform aspects of file management. Modifying a data object may include any type of data change within a volume, from creating, modifying, renaming, moving, or deleting a file to creating, modifying, renaming, moving, or deleting a directory. In one example, file system drivers 206 may be configured to allow data to be stored to system memory 104 and/or storage device(s) 112 according to a file system based on a File Allocation Table (FAT) file system according to the techniques described herein. It should be noted that in some examples, file system drivers 206 may be implemented as one driver binary that implements multiple file systems (e.g., both FAT and exFAT file systems). In other examples, file system drivers 206 may include a separate binary driver for respective file systems. Further, operating system 108 and/or file system drivers 206 may further be configured to examine storage devices, such as, for example, storage device(s) 118, and correct errors. fsck is a command available in Linux that may be used to check and optionally repair a volume defined according to a file system. chkdsk is a command available in Windows® operating systems that may be used to check and optionally repair a volume defined according to a file system.

Figure 3:
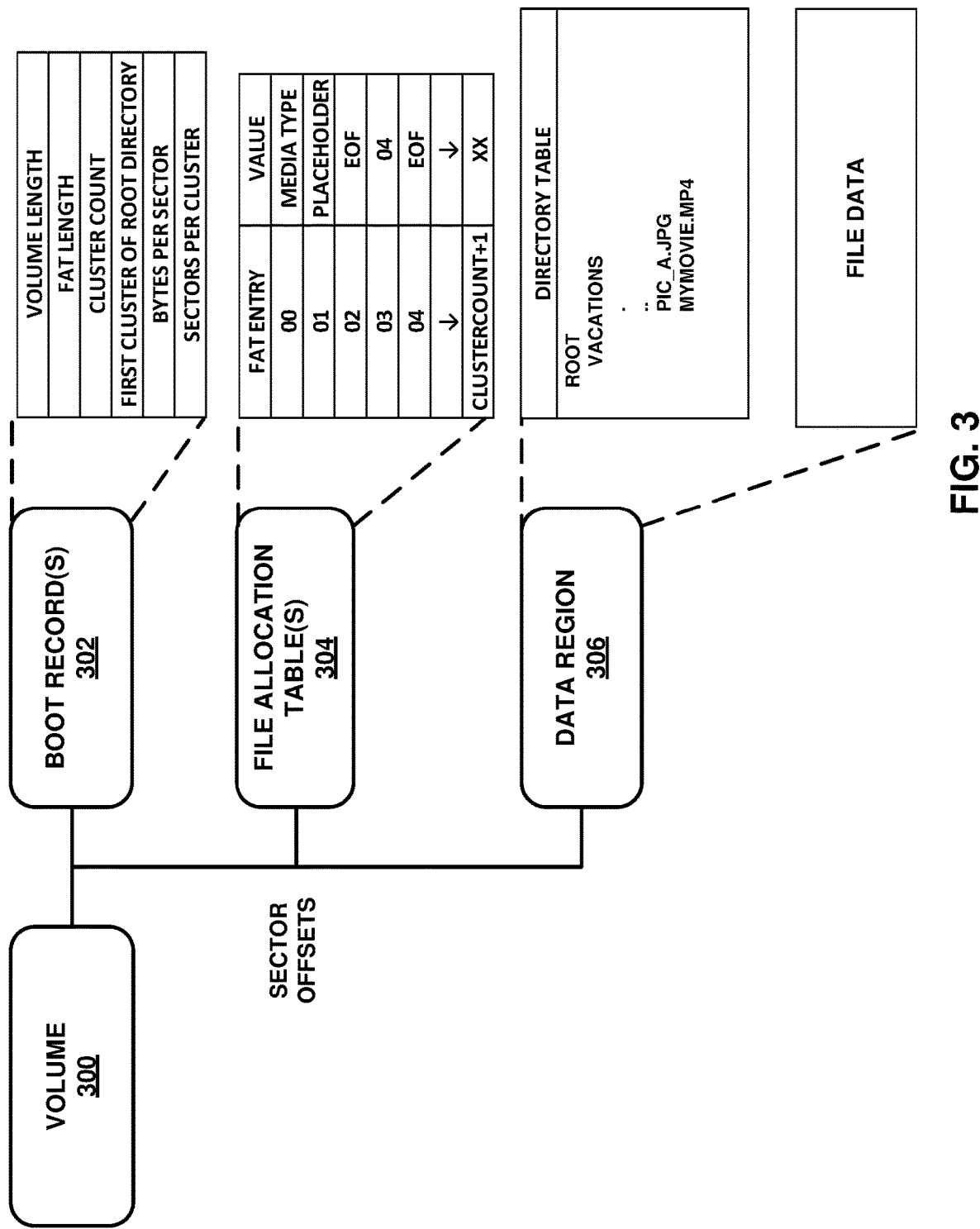
FIG. 3 is a conceptual diagram illustrating an example of a volume defined according to an example file system according to one or more techniques of this disclosure.

FIG. 3 is a conceptual diagram illustrating an example of a volume defined according to an example file system. In one example, volume 300 may be defined according to a FAT file system (e.g., FAT12, FAT16, and FAT32), including FAT file systems implementing the techniques described herein. It should be noted that although in some examples volume 300 is described with respect to a FAT file system, the techniques described herein are not necessarily limited to an FAT file systems and may be used with other file systems. Further, it should be noted that example volume 300 represents an illustrative example of a volume and, for the sake of brevity, is not intended as an exhaustive description of a volume defined according to a file system. Additional details of a volume may be found in a corresponding file system specification. For example, in the case where volume 300 is defined according to a file system based on the one or more of the FAT12, FAT16, and FAT32 file systems, additional details of volume may be found in the Microsoft Extensible Firmware Initiative FAT32 File System Specification (version 1.03 Dec. 6, 2000).

In the example illustrated in FIG. 3, volume 300 includes boot record(s) 302, file allocation table(s) 304, and data region 306. Each of boot record(s) 302, file allocation table(s) 304, and data region 306 may be addressable on a storage device, such as, and for example, storage device(s) 112, according to a sector value. Boot record(s) 302 include data entries describing file system parameters. In one example, boot record(s) 302 include data for bootstrapping the volume, fundamental file system parameters for the volume, and various error checking information. Boot record(s) 302 may include one or more boot records. In one example, boot record(s) 302 include a primary boot record and a backup boot record, where the backup boot record is a replica of the primary boot record. As illustrated in FIG. 3, examples of information included in boot record(s) 302 include volume length, file allocation table length, cluster count, first cluster of root directory, bytes per sector, and sectors per cluster. In one example, volume length specifies the size of the volume 300 in sectors. In one example, file allocation table length specifies the size of a file allocation table 304 in sectors. In one example, cluster count specifies the number of clusters included in data region 306. It should be noted that although not illustrated in FIG. 3, boot record(s) 302 may also include information indicating a percentage of clusters which are allocated and information that allows volume 300 to be boot-strapped. Boot record(s) 302 may be updated as files and directories are modified. In one example, first cluster of root directory specifies a sector location of the root directory in data region 306.

In one example, bytes per sector specifies the number of bytes included in a sector. In one example, the number of bytes per sector may be expressed in power of 2 notation and may range from a minimum of 512 bytes per sector to a maximum of 4096 bytes per sector. In one example, sectors per cluster specifies the number of sectors per cluster. In one example, the minimum number of sectors per cluster may be one and the maximum number of sectors per cluster may provide for a maximum cluster size of 32 kiB. It should be noted that, in some examples, the size of a cluster may be dependent on the volume size and/or an operating system. For example, for standard compliant FAT volumes for the largest volumes, defined as volumes greater than 32 Gigabytes (GiB) (where 1 GiB is $1,024^3$ bytes), the cluster size would be the maximum cluster size for FAT, which is 32 kiB (e.g., 64 sectors of 512 bytes or 8 sectors of 4096 bytes). A standard compliant 32 GiB FAT volume would use clusters having a size of 16 kiB. A standard compliant 16 GiB FAT volume would use 8 kiB clusters. A standard compliant 8 GiB FAT volume would use 4 kiB clusters. It should be noted that FAT32 supports clusters larger than 32 kiB in some cases. For example, cluster sizes of 128 kiB and 256 kiB may be supported for sector sizes larger than 512 bytes.

File allocation table(s) 304 may include one or more file allocation tables. In one example, file allocation table(s) 304 includes a single file allocation table 304. In another example, file allocation table(s) 304 includes two or more file allocation tables. File allocation table(s) 304 may be used to describe a sequence of clusters (also, referred to as a chain of clusters) that are allocated to a data object, such as a file, in data region 306. As illustrated in FIG. 3, a file allocation table may include an entry and a value corresponding to the entry. In the example illustrated in FIG. 3, entry 00 includes a value indicating a media type and entry 01 includes a placeholder value. Entries 02 through ClusterCount+1 may provide information describing sequences of clusters allocated to a data object. In one example, entries may include a value indicating a subsequent cluster entry in a sequence of clusters, a value indicating a "bad" cluster, a value indicating that the cluster is not in use, or a value indicating the end of a sequence of clusters (EOF).

In the example illustrated in FIG. 3, root file directory begins at cluster 02. As illustrated in FIG. 3, entry 02 includes an EOF marker which indicates that the root directory is not assigned any additional clusters. As illustrated in FIG. 3, entry 03 includes an address of 04, indicating that the next cluster in the sequence for the data object is cluster 04. Entry 04 includes an EOF marker which indicates that the data object is not allocated any additional clusters. In this manner, file allocation table(s) may be used to identify a sequence of clusters allocated to a data object. It should be noted that although in the example illustrated in FIG. 3 that the clusters allocated to an data object are consecutive, in other examples, clusters allocated to an data object may include clusters that are not consecutive (e.g., entry 03 pointing to entry 07, etc.).

Data region 306 may be the region of volume 300 where data that makes up a data object is stored. In some examples, data region 306 may be referred to a cluster heap. Data region 306 may include data objects representing one or more types of files. For example, data region 306 may include a word processing document, such as, for example, a Microsoft Word document, media files, such as, for example, a JPEG file, video files, and/or other types of files. As described above, information regarding the configuration of data region 306 may be included in boot record(s) 302 (e.g., cluster count and percentage of clusters allocated). It should be noted that in most cases, boot record(s) 302 are typically updated on a mounting event. As further described above, a modification to a data object stored in data region 306 may require file allocation table(s) 304 to be updated. As illustrated in FIG. 3, data region includes directory table and file data. As described above, a directory table may include entries describing a tree structure which indicates a relationship between files and directories. For example, directory table may indicate that a particular file is stored in a sub-directory of a parent directory.

In the example illustrated in FIG. 3, directory table includes a root directory and a "VACATIONS" directory. As further illustrated in FIG. 3, a picture file ("PIC_A.JPG") is included within the "VACATIONS" directory and a video file ("MYMOVIE.MP4") is included within the "VACATIONS" directory. In the example illustrated in FIG. 3, the root directory may include general information about the volume and the data region. It should be noted that directory entries may include one or more records of different types as defined according to a file system. One or more records may map a data object to a data region. For example, a first cluster field in a record may provide an initial mapping of a file to one or more clusters of data. As data objects stored to a volume are modified, the records may be updated. File data may include data representing a file, such as, for example, PIC_A.JPG and MYMOVIE.MP4 in the example of FIG. 3.

As described above, directory entries included in a directory table may include one or more records of different types. FIG. 4 is a conceptual diagram illustrating examples of directory entry record formats according to one or more techniques of this disclosure. Example directory entry 400 illustrated in FIG. 4 corresponds to a directory record defined according to FAT12, FAT16, and FAT32. Referring to FIG. 4, directory entry 400 includes a 32-byte directory entry record 402 (which may be referred to as a short directory entry record) and may include one or more 32-byte long name directory entry record(s) 404. The number of long name directory entry record(s) 404 is based on the length of a file name. That is, in FAT32 file names longer than 11 characters require one or more long name directory entries.

Table 1 provides a summary of the directory entry structure for short directory entries according to FAT32. It should be noted that for the sake of brevity a complete description of the directory entry structure for short directory entries and the directory entry structure for long directory entries according to FAT32 are not provided herein. However, reference is made to the Microsoft Extensible Firmware Initiative FAT32 File System Specification (version 1.03 Dec. 6, 2000).

TABLE 1

| Name | Offset (byte) | Size (bytes) | Description |
| --- | --- | --- | --- |
| DIR_Name | 0 | 11 | Short name character values |
| DIR_Attr | 11 | 1 | File attributes flags. |
| DIR_NTRes | 12 | 1 | Reserved for Windows NT. Set to 0 when file is created. |
| DIR_CrtTimeTenth | 13 | 1 | Millisecond stamp at file creation time. |
| DIR_CrtTime | 14 | 2 | Time file was created. |
| DIR_CrtDate | 16 | 2 | Date file was created. |
| DIR_LstAccDate | 18 | 2 | Last access date. |
| DIR_FstClusHI | 20 | 2 | High word of entry's first cluster number. |
| DIR_WrtTime | 22 | 2 | Time of last write. |
| DIR_WDate | 24 | 2 | Date of last write. |
| DIR_FstClusLO | 26 | 2 | Low word of entry's first cluster number. |
| DIR_FileSize | 28 | 4 | 32-bit unsigned value indicating file's size in bytes. |

As provided in Table 1 and illustrated in FIG. 4, a 4-byte field providing the file size is included in the short directory entry and as such, as described above, FAT32 supports a maximum file size of $2^{32}$ (4,294,967,296) bytes (i.e., 4 GiB). It should be noted that in FAT32, the value for bytes may include hexadecimal numbers. Table 2 provides a relationship between binary values and hexadecimal values. For example, a hexadecimal value of 2F (which may be denoted as 0x2F or 2Fh) would correspond to binary value of 0010 1111.

TABLE 2

| Decimal | Hexadecimal | Binary |
| --- | --- | --- |
| 0 | 0 | 0000 |
| 1 | 1 | 0001 |
| 2 | 2 | 0010 |
| 3 | 3 | 0011 |
| 4 | 4 | 0100 |
| 5 | 5 | 0101 |
| 6 | 6 | 0110 |
| 7 | 7 | 0111 |
| 8 | 8 | 1000 |
| 9 | 9 | 1001 |
| 10 | A | 1010 |
| 11 | B | 1011 |
| 12 | C | 1100 |
| 13 | D | 1101 |
| 14 | E | 1110 |
| 15 | F | 1111 |

As provided in Table 1 and illustrated in FIG. 4, a one byte field providing attributes of a data object is included in the short directory entries. Table 3 provides a summary of attributes specified in FAT32 values. As illustrated in Table 3, attributes are indicated using flags. For example, a hidden and read only file would include the byte value of 0000 0011 or a hexadecimal value of 03h. As further illustrated in Table 3, particular bit combinations provide special cases indicating a directory entry is a long directory entry.

TABLE 3

| Name | Flag Value | Description |
|---|---|---|
| ATTR_READ_ONLY | 0x01 | Indicates that writes to the file should fail. |
| ATTR_HIDDEN | 0x02 | Indicates that normal directory listings should not show this file. |
| ATTR_SYSTEM | 0x04 | Indicates that this is an operating system file. |
| ATTR_VOLUME_ID | 0x08 | There should only be one "file" on the volume that has this attribute set, and that file must be in the root directory. |
| ATTR_DIRECTORY | 0x10 | Indicates that this file is actually a container for other files. |
| ATTR_ARCHIVE | 0x20 | This attribute supports backup utilities. |
| ATTR_LONG_NAME | Bit combinations: 0000 1111 0011 1111 | Indicates that the "file" is actually part of the long name entry for some other file |

As provided in Table 1 and illustrated in FIG. 4, one byte fields provide respective characters forming a name of a data object. Table 4 provides a mapping of hexadecimal values to ASCII characters. For example, "PIC_A" would be indicated using the following hexadecimal values: 50h 49h 43h 5Fh 41h. It should be noted that in FAT32 unused character bytes are specified using the value 20h.

TABLE 4

00 - NULL
01 - SOH
02 - STX
03 - ETX
04 - EOT
05 - ENQ
06 - ACK
07 - BEL
08 - BS
09 - TAB
0A - LF
0B - BT
0C - FF
0D - CR
0E - SO
0F - SI
10 - DLE
11 - DC1
12 - DC2
13 - DC3
14 - DC4
15 - NAK
16 - SYN
17 - ETB
18 - CAN
19 - EM
1A - SUB
1B - ESC
1C - FS
1D - GS
1E - RS
1F - US
20 - SPC
21 - !
22 - "
23 - #
24 - $
25 - %
26 - &
27 - '
28 - (
29 - )
2A - *
2B - +

TABLE 4-continued

2C - ,
2D - -
2E - .
2F - /
30 - 0
31 - 1
32 - 2
33 - 3
34 - 4
35 - 5
36 - 6
37 - 7
38 - 8
39 - 9
3A - :
3B - ;
3C - <
3D - =
3E - >
3F - ?
40 - @
41 - A
42 - B
43 - C
44 - D
45 - E
46 - F
47 - G
48 - H
49 - I
4A - J
4B - K
4C - L
4D - M
4E - N
4F - O
50 - P
51 - Q
52 - R
53 - S
54 - T
55 - U
56 - V
57 - W
58 - X
59 - Y
5A - Z
5B - [
5C - \
5D - ]
5E - ^
5F - _
60 - '
61 - a
62 - b
63 - c
64 - d
65 - e
66 - f
67 - g
68 - h
69 - i
6A - j
6B - k
6C - l
6D - m
6E - n
6F - o
70 - p
71 - q
72 - r
73 - s
74 - t
75 - u
76 - v
77 - w
78 - x
79 - y
7A - z
7B - {

TABLE 4-continued

7C - |
7D - }
7E - ~
7F -

Figure 5:
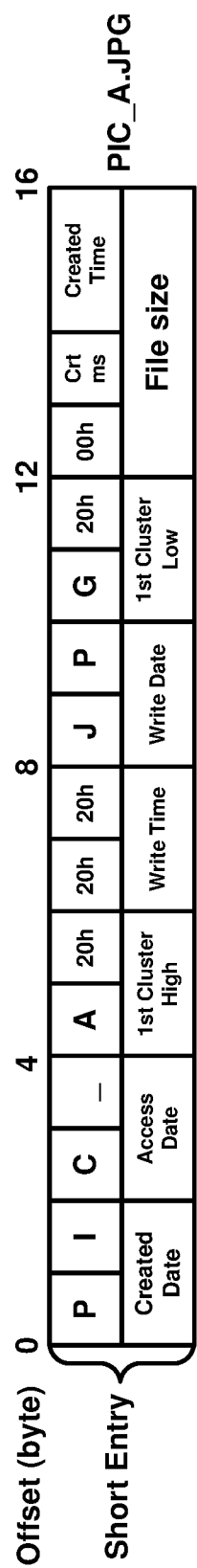
FIG. 5 is a conceptual diagram illustrating an example of a directory entry associated with a file according to one or more techniques of this disclosure.

In this manner, FAT32 file system drivers may read and write values for each field in a short name directory entry and zero or more long name directory entries for particular data objects. FIG. 5 illustrates an example of a directory entry for a file "PIC_A.JPG." In one example, "PIC_A.JPG" may be a digital image file included in "VACATIONS" directory described above and may have a file size less than the maximum file size provided by FAT32, (i.e., 4 GiB). As described above, it may be useful to enable support for larger maximum file sizes while utilizing the FAT32 file system. For example, "MYMOVIE.MP4" included in "VACATIONS" directory, described above, may be a digital video file and may have a file size greater than the maximum file size provided by FAT32, (e.g., MYMOVIE.MP4 may be greater than 4 GiB). According to the techniques described herein, file sizes larger than 4 GiB may be included in a FAT32 volume by representing the file as a directory, where the name of the directory is the name of the large file, and including directory entries having special name field values (i.e., special character strings) in the directory.

Figure 6A:
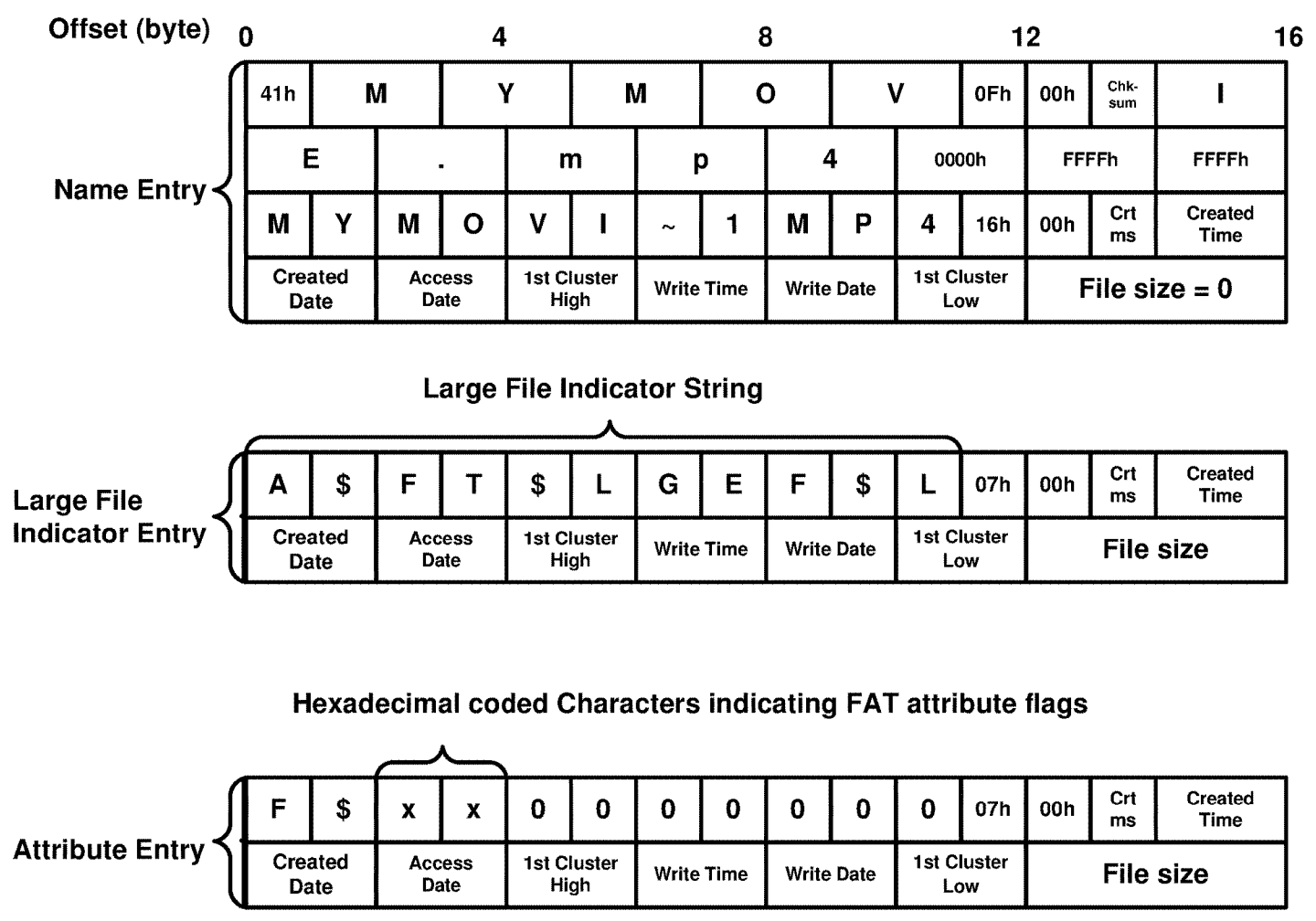
Figure 6B:
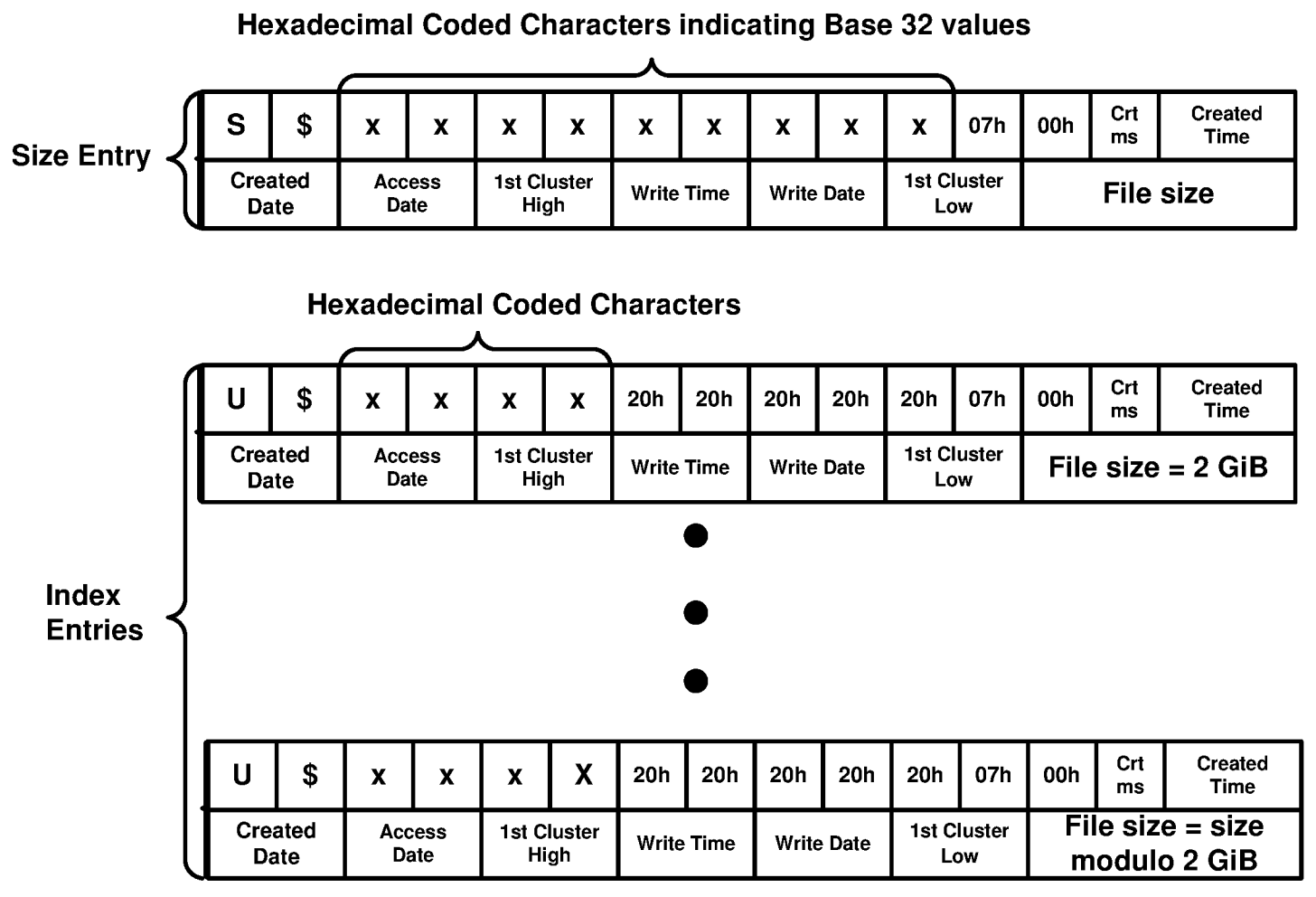

FIGS. 6A-6B are conceptual diagrams illustrating examples of directory entries associated with a large file according to one or more techniques of this disclosure. Referring to FIG. 6A, for MYMOVIE.MP4, a name entry including a long directory entry and a short directory entry are illustrated. In the example illustrated in FIG. 6A, the directory entry structure of the long directory entry and the short directory correspond to the structure provided in FAT32. It should be noted that, as illustrated in FIG. 6A, the short name directory entry includes a value of 16h for the DIR_Att. That is, in this manner, the file MYMOVIE.MP4 is represented as a FAT32 directory that is indicated as HIDDEN and SYSTEM. In this manner, a file system driver and/or an application may determine that the directory MYMOVIE.MP4 may be a directory representation of a file having a file size larger than a maximum file size based on the values of DIRECTORY, HIDDEN and SYSTEM flags. According to the techniques of this disclosure, when a file system driver (or application) encounters such a directory, the file system driver may read the contents of the directory to further determine whether the directory is a representation of a large file. FIGS. 6A-6B illustrate example directory entries that may be included in the directory representation of the large file. It should be noted that the FAT32 standard mandates the initial "." and ".." entries in a directory. As such, the example large file indicator entry, attribute entry, size entry, and index entries may follow the initial "." and ".." entries in a directory.

Referring to FIGS. 6A-6B, each of large file indicator entry, attribute entry, size entry, and index entries include a value of 07h for the DIR_Att and as such are flagged as HIDDEN, SYSTEM and READ-ONLY. It should be noted that in this manner, a standard FAT32 file system driver would treat large files as a HIDDEN and SYSTEM directory including HIDDEN, SYSTEM and READ-ONLY files. In this manner, a standard FAT32 file system driver would be able rename the large file by renaming the directory and delete the large file by deleting the directory and its contents. However, because the files are flagged as READ-ONLY and SYSTEM there is little risk that a standard FAT driver or an application would modify and thus potentially corrupt the large file.

Referring again to FIG. 6A, a large file indicator entry identifies the directory as a representation of a large file by having a name that includes a special character string. In the example illustrated in FIG. 6A, the special character string is "A$FT$LGE.F$L". It should be noted that in other examples, other special character strings may be used. In one example, when the file named "A$FT$LGE.F$L" is created it may be created without having any clusters allocated thereto and may have a file size of zero. It should be noted however, that any allocation found may be left unmodified, unless the large file is being deleted in which case any allocation may be freed together with the file.

Referring again to FIG. 6A, an attribute entry identifies the attributes of large files using characters in the attribute entry name. In the example illustrated in FIG. 6A, an attribute entry is named "F$xx0000.000" where the "xx" are the two hexadecimal digits as characters indicating the FAT attributes of the large file. For example, if the large file is a read only file, i.e., 0x01, according to the mapping of hexadecimal values to ASCII characters provided in Table 4, "xx" would include the following hexadecimal values: 30h 31h. In one example, the "0000.000" component of "F$xx0000.000" are seven hexadecimal digits as characters which shall be set to '0' character when the entry is created and shall be preserved when the file is modified. It should be noted that in other examples, other values may be used for the "0000.000" component.

Referring to FIG. 6B, a size entry identifies the size of large files using characters in the size entry name In the example illustrated in FIG. 6B, the size entry is named "S$xxxxxx.xxx" where each of the x's in "xxxxxx.xxx" are characters indicating a Base32 value. Table 5 provides an example of a Base32 alphabet that may be used to map a character to values 0-31. It should be noted that in some examples, lower case values a-v may also be mapped to 10-31. Further, it should be noted that in other examples, other Base32 alphabets may be used. Using nine Base32 values allows for a maximum file size of 35184372088831 bytes (i.e. $32^9$), which is just under 32 TiB. It should be noted that the maximum volume size for FAT is 2 TiB with 512 byte sectors and 16 TiB with 4096 byte sectors. It should be noted that in other examples, other maximum sizes may be used for large files. For example, a maximum file size of $32^7$ may be used for large files. In this example, two of the x's in "xxxxxx.xxx" may be used to provide additional information with respect to the large file (e.g., attribute values).

TABLE 5

| Hex-Char. | Value |
|---|---|
| 30h - 0 | 0 |
| 31h - 1 | 1 |
| 32h - 2 | 2 |
| 33h - 3 | 3 |
| 34h - 4 | 4 |
| 35h - 5 | 5 |
| 36h - 6 | 6 |
| 37h - 7 | 7 |
| 38h - 8 | 8 |
| 39h - 9 | 9 |
| 41 - A | 10 |
| 42 - B | 11 |
| 43 - C | 12 |

TABLE 5-continued

| Hex-Char. | Value |
|---|---|
| 44 - D | 13 |
| 45 - E | 14 |
| 46 - F | 15 |
| 47 - G | 16 |
| 48 - H | 17 |
| 49h - I | 18 |
| 4Ah - J | 19 |
| 4Bh - K | 20 |
| 4Ch - L | 21 |
| 4Dh - M | 22 |
| 4Eh - N | 23 |
| 4Fh - O | 24 |
| 50h - P | 25 |
| 51h - Q | 26 |
| 52h - R | 27 |
| 53h - S | 28 |
| 54h - T | 29 |
| 55h - U | 30 |
| 56h - V | 31 |

Referring to FIG. 6B, the directory representation of the large file may include zero, one, or more file index entries. In the example illustrated in FIG. 6B, the file index entries are named "U$xxxx" where the "xxxx" are the four hexadecimal digits as characters which make up the index of the sub-file inside the large file. That is, in one example, if the file size specified by "S$xxxxxx.xxx" is above zero, then the directory includes one or more "U$xxxx" sub-files. It should be noted that the four hexadecimal digits allow for a maximum of 65536 sub-files. In the example illustrated in FIG. 6B, large files are indexed using 2 GiB sub-files. For example, a file having a size of 1 TiB would include 512 sub-files. It should be noted that in other examples, other sizes of sub-files may be used for indexing (e.g., 1 GiB, 3 GiB, etc., up to 4 GiB). In one example, files may be indexed using sub-files having a size of 4,290,772,992 bytes (i.e., 4 GiB minus 4 MiB). Further, in some examples, variable length sub-file sizes may be enabled. For example, one of the x's in "S$xxxxxx.xxx" name of the size entry may be used to indicate a sub-file size (e.g., whether sub-files are 1 GiB or 2 GiB).

In the example of 2 GiB sub-files, the first index entry may be named "U$0000" and include the first 2147483648 bytes of the large file, where its first byte corresponds to the first byte of the large file, its second byte corresponds to the second byte of the large file, etc., and the second index entry may be named "U$0001" and its first byte corresponds to the byte at offset 2147483648 in the large file, etc. It should be noted that the last index entry may have a file size less than the file size for previous index files. For example, if the file size of MYMOVIE.MP4 is 5 GiB (i.e. 5368709120 bytes) then a directory MYMOVIE.MP4 would include a file named "S$005000.000" identifying the file size as Base32 5000000, as well as at least three sub-files, e.g., "U$0000" of size 2 GiB, "U$0001" of size 2 GiB and "U$0002" of size 1 GiB or more. FIG. 7 is a conceptual diagram illustrating an example directory entries included in directory table according to an example where MYMOVIE.MP4 is 5 GiB.

In one example, if the file size specified by "S$xxxxxx.xxx" is zero, index files may or may not exist. In this case, a file system driver may not need to look for any files "U$xxxx" even though they may exist. Further, it should be noted that in some examples, if the final sub-file is larger than the specified file size, in some cases, the space may be treated as extra allocated, but unused, space and may be freed and/or truncated by a file system implementation. Similarly, if there are further files with higher index number names than expected based on the specified file size, in some cases, these sub-files may also be treated as unused and may be deleted by a file system implementation.

It should be noted that in some examples, the directory representing the large file may include one or more sub-directories. For example, instead of having the 2 GiB sub-files inside the directory of the large file, sub-directory having attributes DIRECTORY, HIDDEN, and SYSTEM could include the sub-files. For example, entry "S$xxxxxx.xxx" could be a directory including one or more sub-files. It should be noted that including sub-directories would allow that main directory to be smaller and thus it may be parsed more quickly. In some examples, an implementation may support entry "S$xxxxxx.xxx" being either a file or a directory including sub-files. In some cases, the number of sub-files may be used to determine whether "S$xxxxxx.xxx" is a file or a directory.

It should be noted that in some examples, if a large file is truncated to less than 4 GiB in size (e.g., a portion of a video is deleted), a file system driver (or application) implementation may convert the large file directory representation to the standard FAT32 file format. Further, in some examples, if a standard FAT32 file is extended to 4 GiB or above (e.g., a video recording application is continuously recording) a file system driver (or application) implementation may convert the file to the above described large file directory representation format. It should be noted that a standard FAT driver would fail such an extension operation.

In the case where a file is extended above 4 GiB, a file system driver (or application) may allocate a cluster in the FAT for the directory representing the file and set up "." and ".." entries in the directory, as well as, the "A$FT$LGE.F$L", "F$xx0000.000" and "S$000000.000" entries described above. The file system driver may also create the entries for "U$XXXX" sub-files and for each sub-file set flags to READ-ONLY, HIDDEN, SYSTEM and further set the file size to 2 GiB (except the file size for last sub-file may be set to file size modulo 2 GiB). A file system driver may then set the first cluster fields (i.e., $1^{st}$ Cluster High and $1^{st}$ Cluster Low) for each sub-file to the corresponding first cluster value of the corresponding FAT chain fragments (i.e., U$0000 gets first cluster from file being converted and U$0001 gets first cluster set to the cluster at offset 2 GiB inside the original file, etc.) The file system driver may then split the cluster chain of the original file starting at the original first cluster for the file inserting an End Of Chain terminator at each 2 GiB boundary. It should be noted that in this instance, there are now multiple FAT chains e.g., one 2 GiB FAT chain containing the first 2 GiB of the file and one or more additional FAT chains containing additional 2 GiB parts of the file. The file system driver may then change the first cluster fields for the file to the above allocated cluster for the directory, set file size to zero (directories on FAT32 record their size as zero) and set the flags to DIR, HIDDEN, SYSTEM and as such, complete the conversion.

In the case where a file is truncated below 4 GiB, a file system driver (or application) may update the cluster chain by concatenating FAT chains. For example, sub-files U$0000 and U$0001 may be concatenated by replacing the End of Chain terminator of U$0000 with the first cluster value of U$0001. After the sub-file cluster chains are concatenated, the file system driver may change the first cluster fields for the large file directory to the first cluster of U$0000, set file size in the large file directory to the large file size (from S$000000.000 entry) and set the flags in the large file directory to the values provided by the F$xx0000.000 entry. The file system driver may then free the no longer in-use directory cluster(s).

As described above, operating system 108 and/or file system drivers 206 may be configured to store data to a storage device, such as storage device(s) 118 according to a volume defined by a file system specification. In one example, operating system 108 and/or file system drivers 206 may be configured to allocate clusters, deallocate clusters, create a data object, delete a data object, and/or rename a data object. As described above, operating system 108 and/or file system drivers 206 may be configured to cause data to be stored to a storage device according to a volume based on instructions received by one or more applications. In one example, operating system 108 and/or file system drivers 206 may be configured to store large files according to one or more of the techniques described herein.

Figure 8:
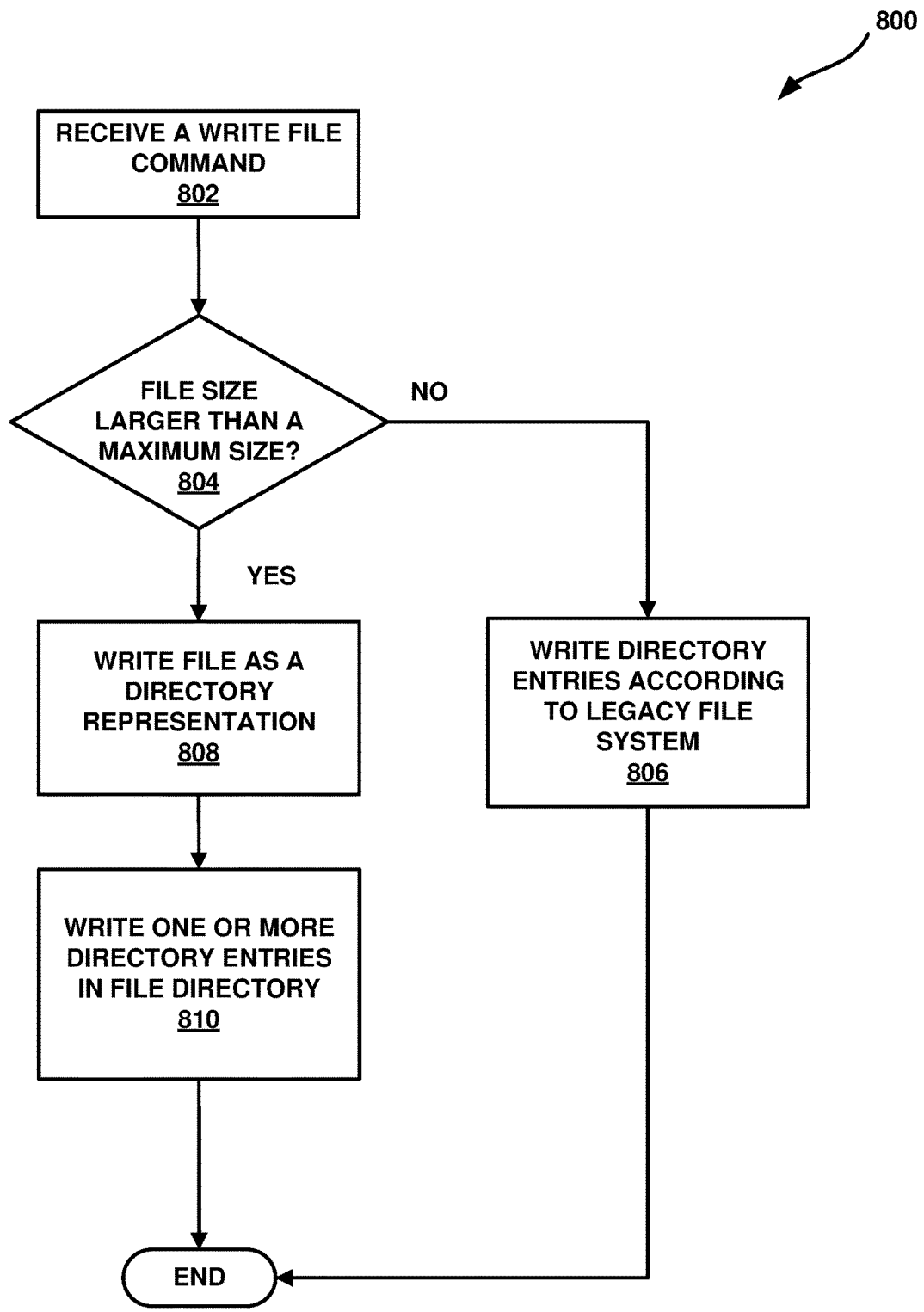
FIG. 8 is a flowchart illustrating an example of writing directory entries for a large data object according to one or more techniques of this disclosure.

FIG. 8 is a flowchart illustrating an example of writing directory entries for a large data object according to one or more techniques of this disclosure. It should be noted that although flowchart 800 is described with respect to file system driver 206, the techniques illustrated in FIG. 8 may be performed by computing device 100 and any combination of components thereof. Further, the techniques described herein may be implemented by an application operating on top of a standard FAT driver. File system driver 206 receives a write file command (802). File system driver 206 determines whether the file size is larger than a maximum file size (804). For example, file system driver 206 may determine whether a file size is larger than the 4 GiB size provided by FAT32. Upon determining that the file size is not larger than the maximum file size, file system driver 206 may write directory entries according to a legacy file system (806). For example, if file system driver 206 determines that a file size is not larger than the 4 GiB size provided by FAT32, file system driver may write short name and zero or more long name directory entries as provide by FAT32, as described above.

Upon determining that the file size is larger than the maximum file size, file system driver 206 may write directory entries for the file according to a directory representation (808). For example, if file system driver 206 determines that a file size is larger than the 4 GiB size provided by FAT32, file system driver 206 may write a directory entry indicating a directory having a HIDDEN and SYSTEM flag for a file, as described above. File system driver 206 may write one or more directory entries in the file directory (810). For example, file system driver 206 may write directory entries having special character strings indicating properties of a file and zero or more entries corresponding to sub-files, as described above. In this manner, computing device 100 represents an example of a device configured to store large files using standard file systems.

Figure 9:
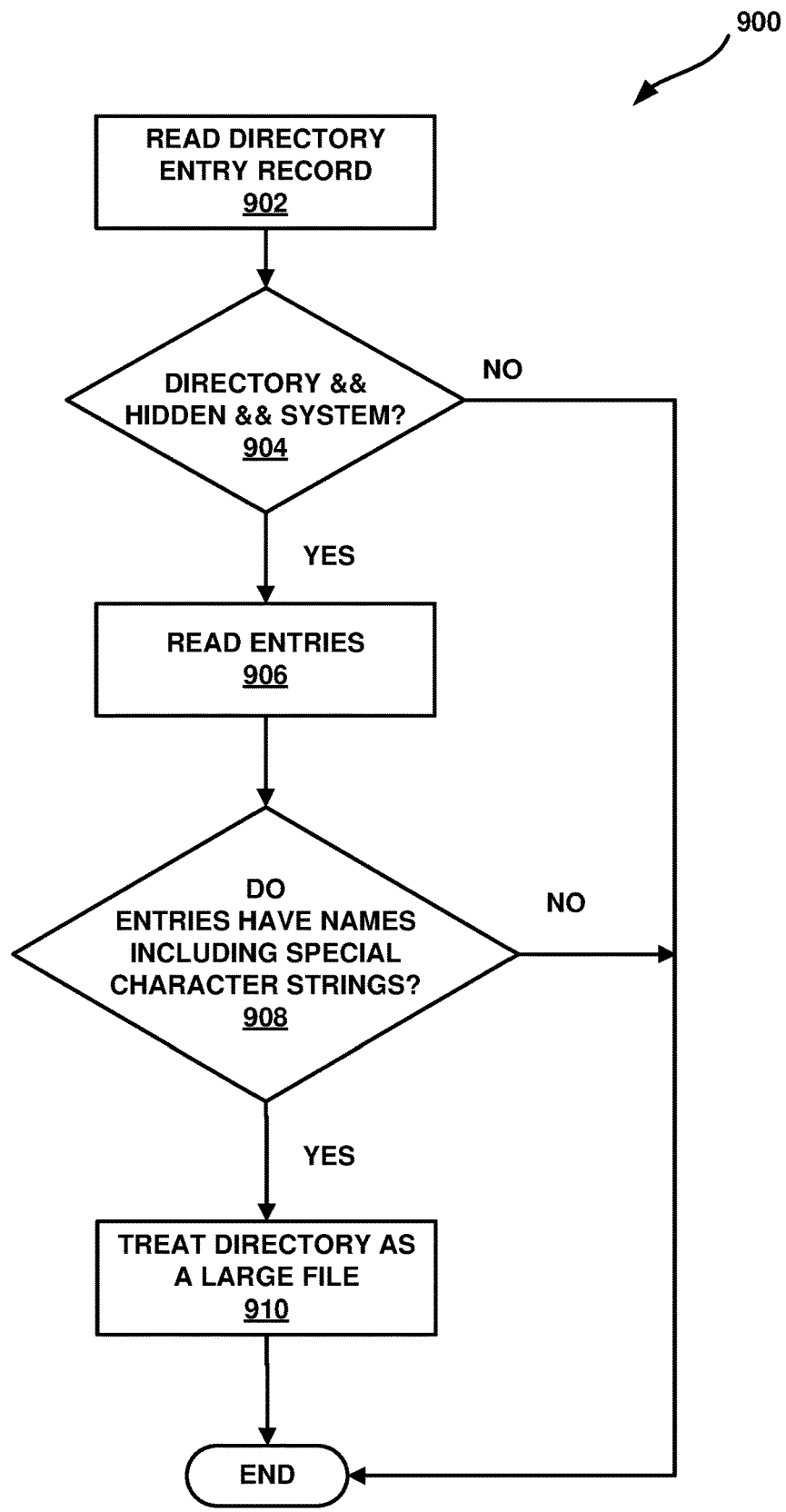
FIG. 9 is a flowchart illustrating an example of reading directory entries for a large data object according to one or more techniques of this disclosure.

FIG. 9 is a flowchart illustrating an example of reading directory entries for a large data object according to one or more techniques of this disclosure. It should be noted that although flowchart 900 is described with respect to file system driver 206, the techniques illustrated in FIG. 9 may be performed by computing device 100 and any combination of components thereof. File system driver 206 reads a directory entry record (902). File system driver 206 determines whether the directory entry record indicates that the data object is a directory and whether HIDDEN and SYSTEM flag are set (904). Upon determining that the directory entry record indicates that the data object is a directory and has HIDDEN and SYSTEM flags set, file system driver 206 reads the directory entries within the directory (906). File system driver 206 determines whether the entries have names including special character strings (908). For example, file system driver 206 may determine whether an entry includes any of the large file indicator, attribute entry, size entry, and/or index entries, as described above. Upon determining that the entries have names including special character strings, file system driver 206 may treat the directory as a large file (910). For example, file system driver 206 may use index entries as described above to read sub-files forming a large file. In this manner computing device 100 represents an example of a device configured to store large files using legacy file systems.

As described above, kernel 202 may be a kernel based on a Linux kernel. The Linux kernel includes a virtual filesystem that includes defined methods and data structures. The virtual filesystem serves as an abstraction that enables applications to interoperate with various defined file systems. The Virtual Filesystem (or Virtual File Switch) defined for the Linux Kernel includes the following data structures: a superblock object, an Mode object, a dentry object, and a file object. It should be noted that the Virtual Filesystem defined for the Linux Kernel includes other types of object, for the sake of brevity, a complete discussion of the Virtual Filesystem defined in Linux is not described in detail herein. However, reference is made to documentation maintained by the Linux Kernel Organization. Further, it should be noted that the techniques described herein may be generally applicable to various file system abstractions. Further, it should be noted that as used herein the term virtual filesystem may be used to generally refer to an abstraction between an operating system (and/or application) and a third-party file system. For example, FUSE for Mac OS/Android/Linux and Windows filter drivers may be considered examples of virtual filesystems.

In Linux, an instance of a superblock object represents a specific mounted filesystem volume. For example, a superblock object may represent a FAT volume stored to a storage device mounted to a computing device. A superblock object may include an identifier, a file system type (e.g., FAT32), and a list of Modes. An instance of an Mode object represents a specific data object (i.e., an Mode object includes all information needed to manipulate a file or directory). For example, an Mode object may represent a user file included in a FAT volume stored to a storage device. An Mode may be identified by a number and indicate properties of a data object, such as file size. Further, an Mode includes an associated mapping (i.e., an Mode references an address space object) which maps an Mode to pages in device memory. For example, an Mode corresponding to a 48 KiB file, may include an associated mapping that maps the data of a file to twelve 4 KiB pages included in a page cache. An instance of a dentry (i.e., directory entry) object represents a specific component in a path for performing directory specific operations (e.g., path name lookups). An instance of a file object represents a file opened by a process (e.g., a system call associated with an application read). That is, a file object is the in-memory representation of an open file. It should be noted that a file object is created in response to the open( ) system call and destroyed in response to the close( ) system call. Further, because multiple processes can open and manipulate a file at the same time, there can be multiple file objects in existence for the same file. A file object points back to a dentry, which in turn points back to the Mode that actually represents the open file. It should be noted that as used herein the term call may be used to refer to a process, a system call, a task, a function, a thread, or the like.

In Linux, when an application initiates a process to open a file (e.g., invokes a system call to open a file object), the Linux kernel searches the page cache (e.g., using a dentry, Mode, and address space corresponding to the file object) to determine whether the data has been stored to the page cache. If the data is stored to the page cache, the data is read from the page cache without accessing the storage device. If the data is not stored to the page cache, the data is read from the storage device and added to the page cache for subsequent access. If an application initiates a process to write data to a file, data in the page cache is updated. When data is updated in the page cache, the corresponding data stored on the storage device becomes out of date. It should be noted that in this case, the storage device may be referred to as the backing store. Pages in the page cache that are not synchronized with sectors of data on the backing store and are said to be dirty. Dirty pages are eventually written back to the backing store.

As described above, file system driver 206 may be configured to provide a layer of abstraction between applications and/or an operating system and a storage device. In the case of the Linux Kernel and a FAT32 filesystem, file system driver 206 presents a FAT32 volume to a Linux Kernel using the data structures defined for the Virtual Filesystem. Further, when methods defined for Virtual Filesystem objects are called. the file system driver 206 implements the methods in a manner that is hidden to the Linux Kernel. Thus, there are various ways that a file system driver may be implemented in order to serve as an abstraction between applications and/or an operating system and a storage device.

Figure 10:
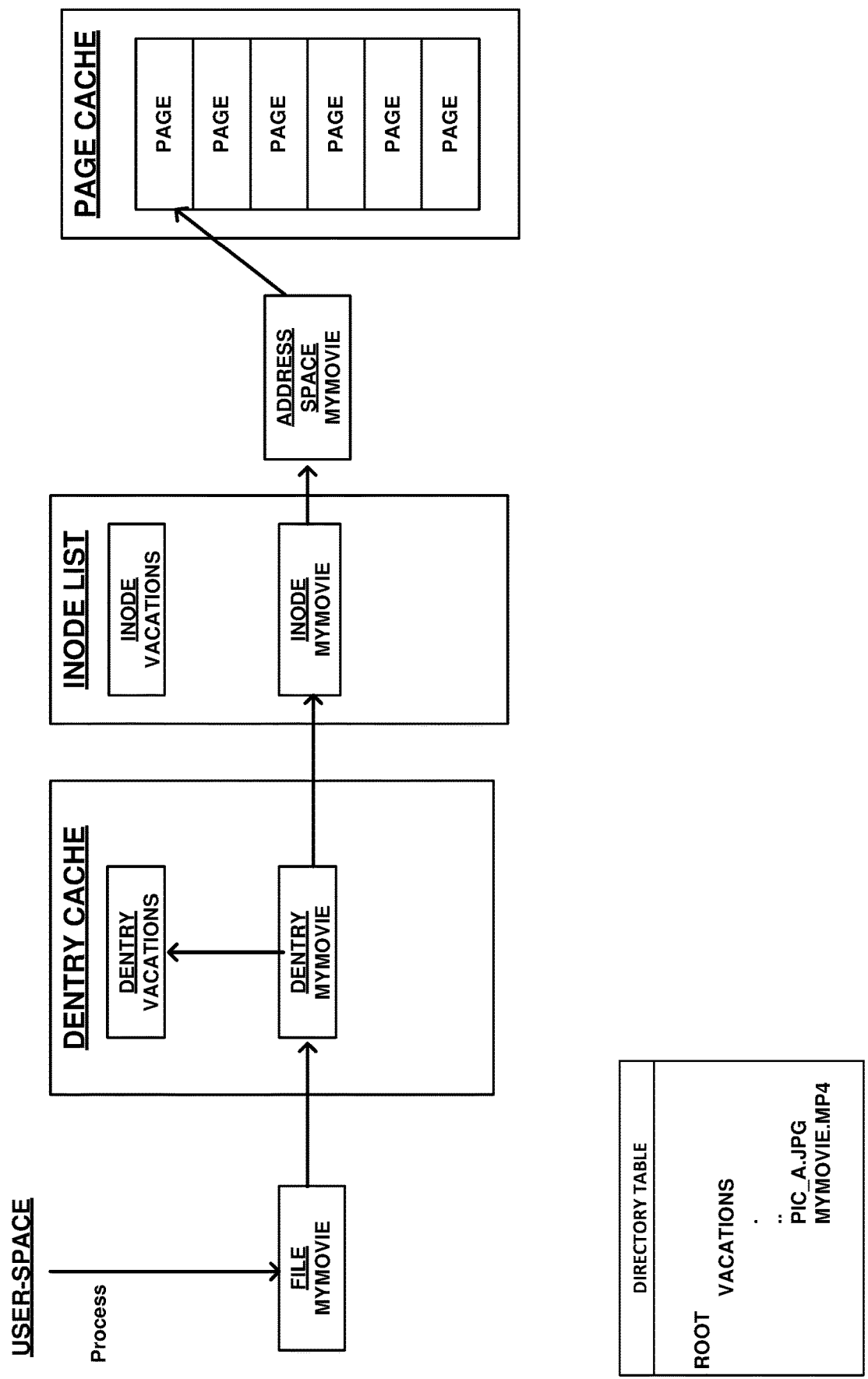
FIG. 10 is a conceptual diagram illustrating examples of data structures that may be invoked according to one or more techniques of this disclosure.

FIG. 10 is a conceptual diagram illustrating examples of data structures that may be invoked according to one or more techniques of this disclosure. The example illustrated in FIG. 10 illustrates an example of how file system driver 206 may invoke a virtual filesystem for an instance of a file (i.e., MYMOVIE.MP4) opened by a process. It should be noted that as illustrated in FIG. 10, MYMOVIE.MP4 is represented as a single entry in the directory table. That is, for example, MYMOVIE.MP4 is a file having a size less than size than 4 GiB included in a FAT32 volume. Thus, in the example illustrated in FIG. 10, file system driver 206 presents MYMOVIE.MP4 to a virtual filesystem using a single dentry object, a single Mode object, and a single address space object. In this case, operations with respect to (MYMOVIE.MP4) may proceed with method calls corresponding to the single dentry object, single Mode object, and single address space object. That is, as illustrated in FIG. 10, in the case where a process includes a user-space read, virtual filesystem may initially handle the call using a read call which invokes a read method implemented by file system driver 206. In particular, file system driver 206 may read the file data from the page cache (if available) using mapping provided by virtual filesystem data structures (e.g., a single dentry object, a single Mode object, and a single address space object).

As described above, according to the techniques described herein, it may be useful to enable support for larger maximum file sizes while utilizing the FAT32 file system by representing the file as a directory including a large file indicator entry, an attribute entry, a size entry and entries for one or more sub-files in the directory. It should be noted that there are various ways that a file system driver may be implemented in order to serve as an abstraction between applications and/or an operating system and a storage device in the case where a file larger than 4 GiB is represented as a directory including a large file indicator entry, an attribute entry, a size entry and entries for one or more sub-files in a FAT32 volume. The techniques described in further detail below provide examples of implementing a file system driver in the case where a file larger than 4 GiB is represented as a directory including a large file indicator entry, an attribute entry, a size entry and entries for one or more sub-files in the directory. It should be noted that the implementation techniques described herein may improve device efficiency, and/or mitigate the possibility of file corruption in the event of device failure.

Figure 11A:
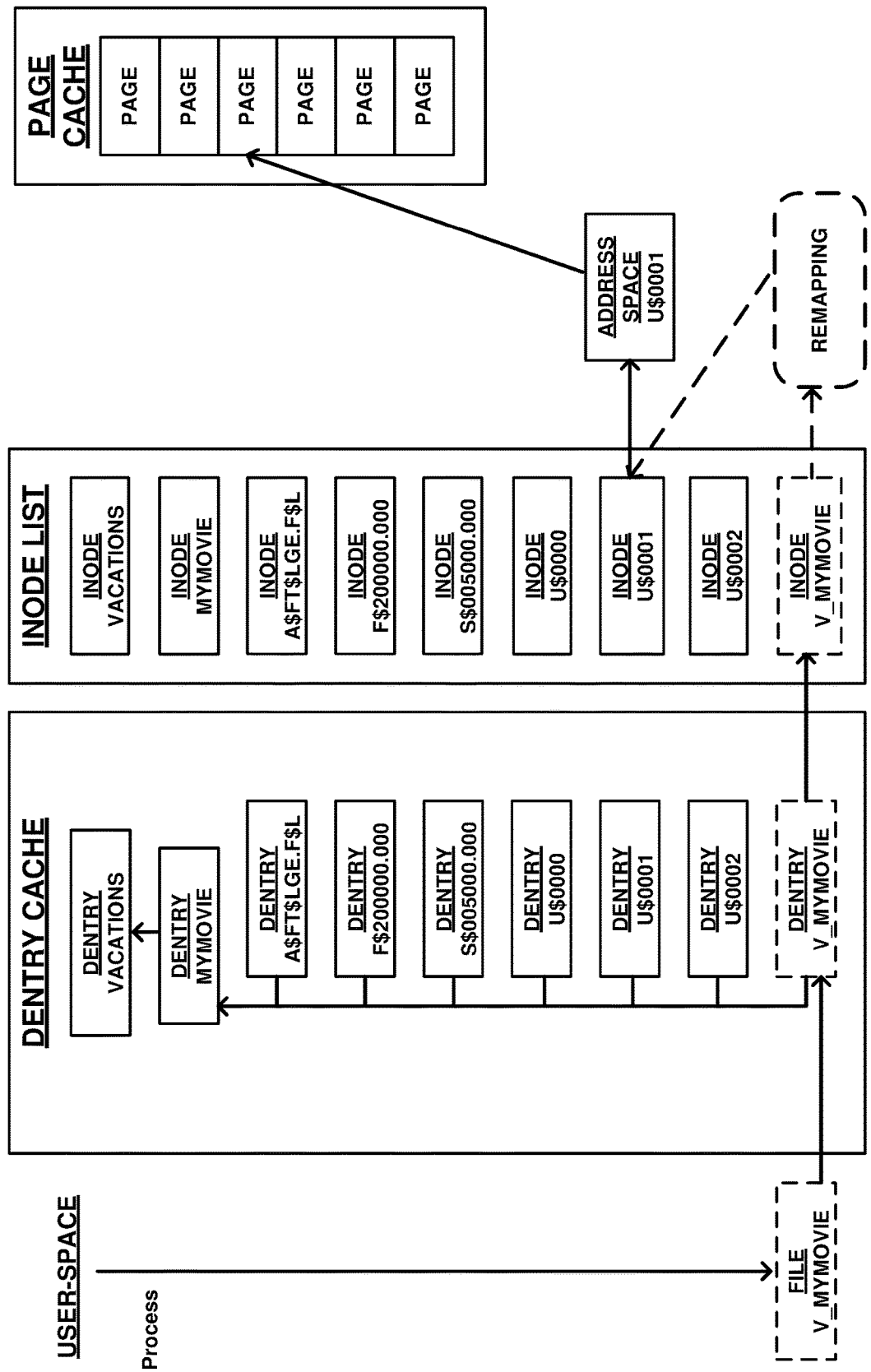
FIG. 11A-11B are conceptual diagrams illustrating examples of data structures that may be invoked according to one or more techniques of this disclosure.
Figure 11B:
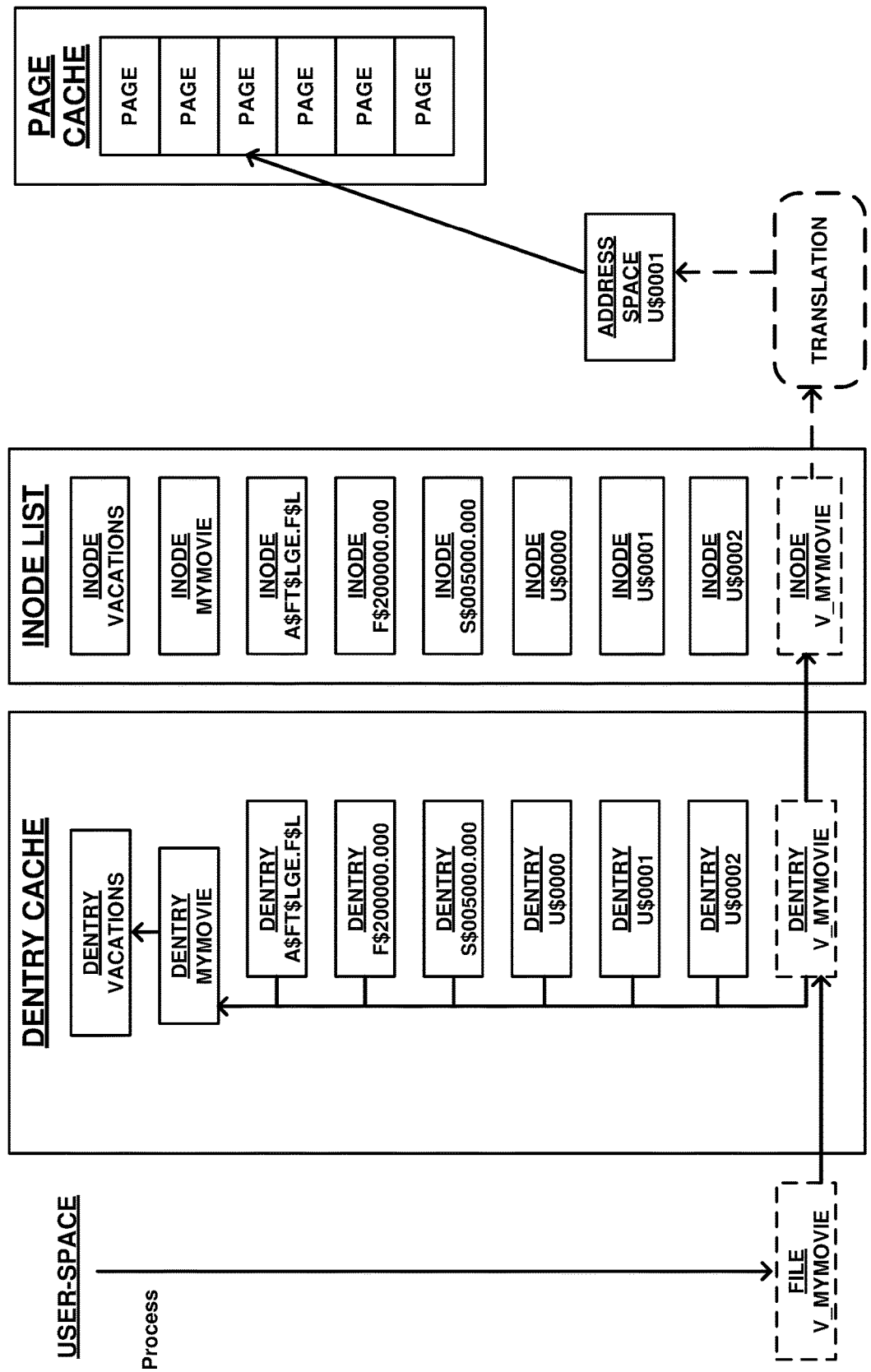
Figure 13:
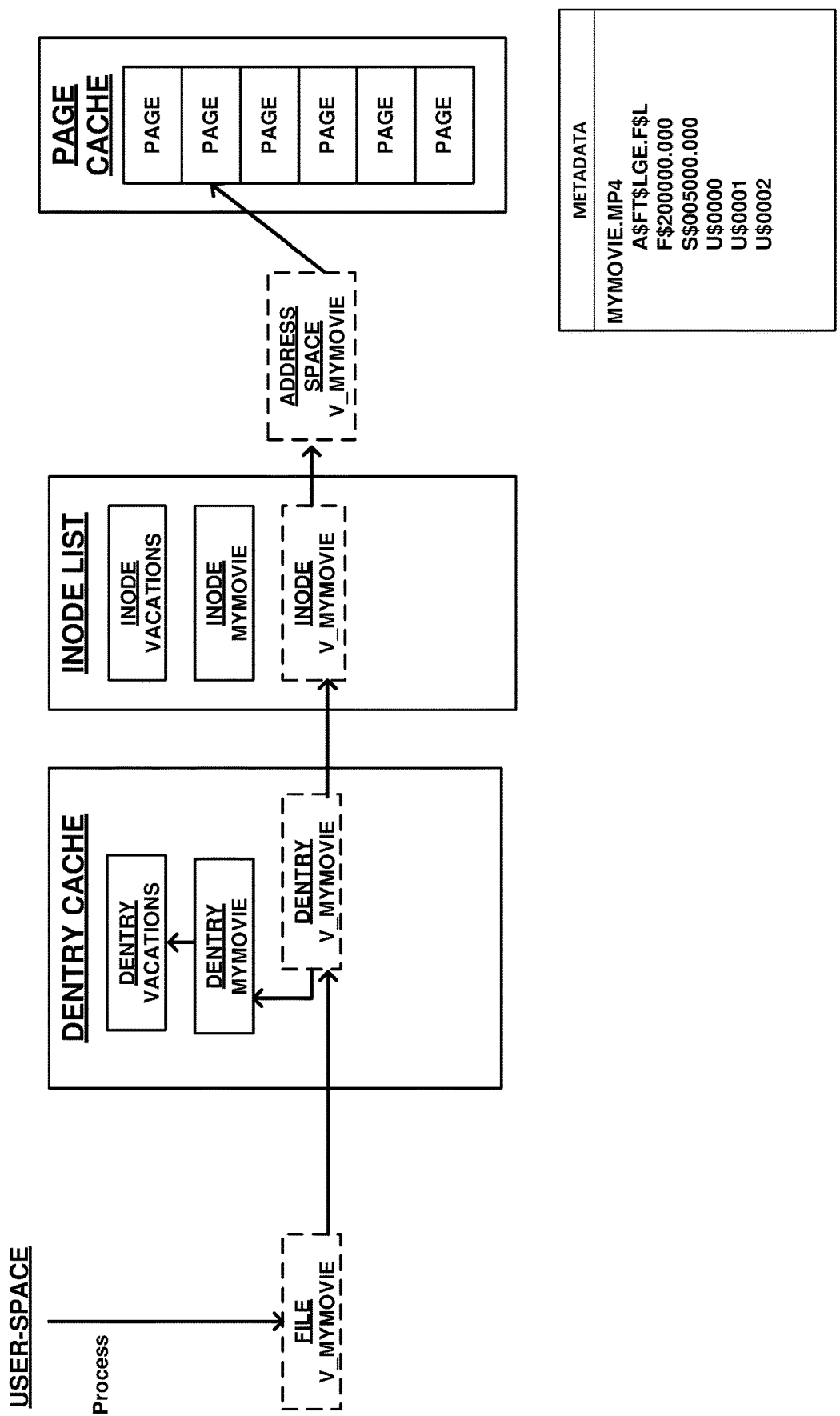
FIG. 13 is a conceptual diagram illustrating examples of data structures that may be invoked according to one or more techniques of this disclosure.

FIGS. 11A-11B and FIG. 13 are conceptual diagrams illustrating examples of data structures that may be invoked according to one or more techniques of this disclosure. It should be noted that in the examples illustrated in FIGS. 11A-11B and FIG. 13 MYMOVIE.MP4 is represented as a directory including a large file indicator entry, an attribute entry, a size entry and entries for one or more sub-files in the directory. That is, for example, MYMOVIE.MP4 is a file included in a FAT32 volume having a size greater than 4 GiB. In particular, the example illustrated in FIGS. 11A-11B and FIG. 13 corresponds to the example directory table illustrated in the example of FIG. 7. It should be noted that, as described above, sub-file sizes other than 2 GiB may be used for indexing. Thus, the descriptions of invoking a virtual filesystem described with respect to FIGS. 11A-11B and FIG. 13 are not limited to particular sub-file sizes.

The examples illustrated in FIGS. 11A-11B illustrate an example of how file system driver 206 may invoke a virtual filesystem for an instance of a file (i.e., MYMOVIE.MP4) opened by a process, where the file is represented as a directory including a large file indicator entry, an attribute entry, a size entry, and entries for one or more sub-files in the directory. As illustrated in FIGS. 11A-11B, each of the MYMOVIE.MP4 directory, A$FT$LGE.F$L, F$200000.000, 005000.000, and the U$0000, U$0001, and U$0002 sub-files are invoked in the virtual filesystem using dentry and Mode objects. Thus, in this example, file system driver 206 presents the entire contents of the directory representing the large file to the kernel. As further illustrated in FIGS. 11A-11B, file system driver 206 presents MYMOVIE.MP4 to the user-space as a file object. That is, file system driver 206 invokes a file object which is a virtual file (i.e., identified as V_MYMOVIE in FIGS. 11A-11B). In this manner, file system driver 206 may be said to present the MYMOVIE.MP4 directory as a directory internally and as a file externally. It should be noted that the Virtual Filesystem in Linux requires a dentry and an Mode for a file object. Thus, as illustrated in FIGS. 11A-11B, file system driver 206 invokes a dentry object (i.e., identified as V_MYMOVIE in FIG. 11A-11B) and an Mode object (i.e., identified as V_MYMOVIE in FIG. 11A-11B) for a file object which is virtual file. Further, as described above, a superblock includes a list of Modes. In the case where an Mode object is invoked for a file object which is virtual file, a list of Modes included in the superblock would include the Mode object. Thus, according to the techniques described herein, in the case where the file is represented as a directory including a large file indicator entry, an attribute entry, a size entry and entries for one or more sub-files in the directory, file system driver 206 may be configured to invoke one or more objects corresponding to a virtual file.

Referring to the example illustrated in FIG. 11A, FIG. 11A further illustrates an example of how user-space processes can be handled by filesystem driver. For example, in the case where a process includes a user-space read, virtual filesystem may initially handle the user-space read using a read call for the virtual file and thus invoke a read method implemented by file system driver 206. In this case, because the virtual file object corresponds to a directory including a large file indicator entry, an attribute entry, a size entry and entries for one or more sub-files in the directory, rather than simply reading file data using the mapping provided by virtual filesystem data structures (e.g., as in the case of a single dentry object, a single Mode object, and a single address space object), file system driver 206 may be configured to remap the read call corresponding to a virtual file object to a read call corresponding to a particular sub-file Mode. For example, if a user-space process requests to read data at a 3 GiB offset of MYMOVIE.MP4, file system 206 driver may determine that the 3 GiB offset corresponds to Mode U$0001 and perform the read operation by reading the U$0001 file data from the page cache (if available) using mapping provided by virtual filesystem data structures (e.g., the U$0001 dentry object, the U$0001 Mode object, and the U$0001 single address space object). In the example illustrated in FIG. 11A file system driver 206 may read the data by invoking a sub-file read call to the kernel and subsequently handling the sub-file read call. It should be noted that in the case where file system driver 206 reads data by remapping a call, a FAT32 driver read calls may be used to subsequently handle the sub-file read call, which may simplify implementation of file system driver 206. That is, in this case, support for files larger than 4 GiB using the FAT32 file system, as described herein, may be implemented as a wrapper on top of an existing FAT32 driver, where the wrapper invokes data structures for a virtual file object and remaps calls corresponding to the virtual file object. It should be noted however, that reading data by remapping calls may in some cases result in duplicate file data being cached for both the virtual file Mode (e.g., Mode V_MYMOVIE) and the sub-file Mode (e.g., Mode U$0001), which may be less than ideal.

Referring to the example illustrated in FIG. 11B, FIG. 11B further illustrates an example of how user-space processes can be handled by file system driver 206. In one example, file system driver 206 may directly read the data without invoking a call to the kernel (i.e., by translating a call). In the case where file system driver 206 directly reads the data without invoking a call to the kernel, file system driver 206 may translate the read call to an address space corresponding to a sub-file. It should be noted that in this case, the caching of duplicate file data may be avoided. However, the translation of calls to an address space cannot be implemented as a wrapper on top of an existing FAT32 driver. It should be noted that for each of the examples illustrated in FIGS. 11A-11B, the attributes of a file may be updated and the size of a file may be updated by respectively renaming an attribute entry and a size entry. It should be noted that although the examples illustrated in FIGS. 11A-11B are described with respect to a read operation, in the case of other user-space process operations (e.g., write operations), file system driver 206 would remap or translate calls in a similar manner.

Figure 12:
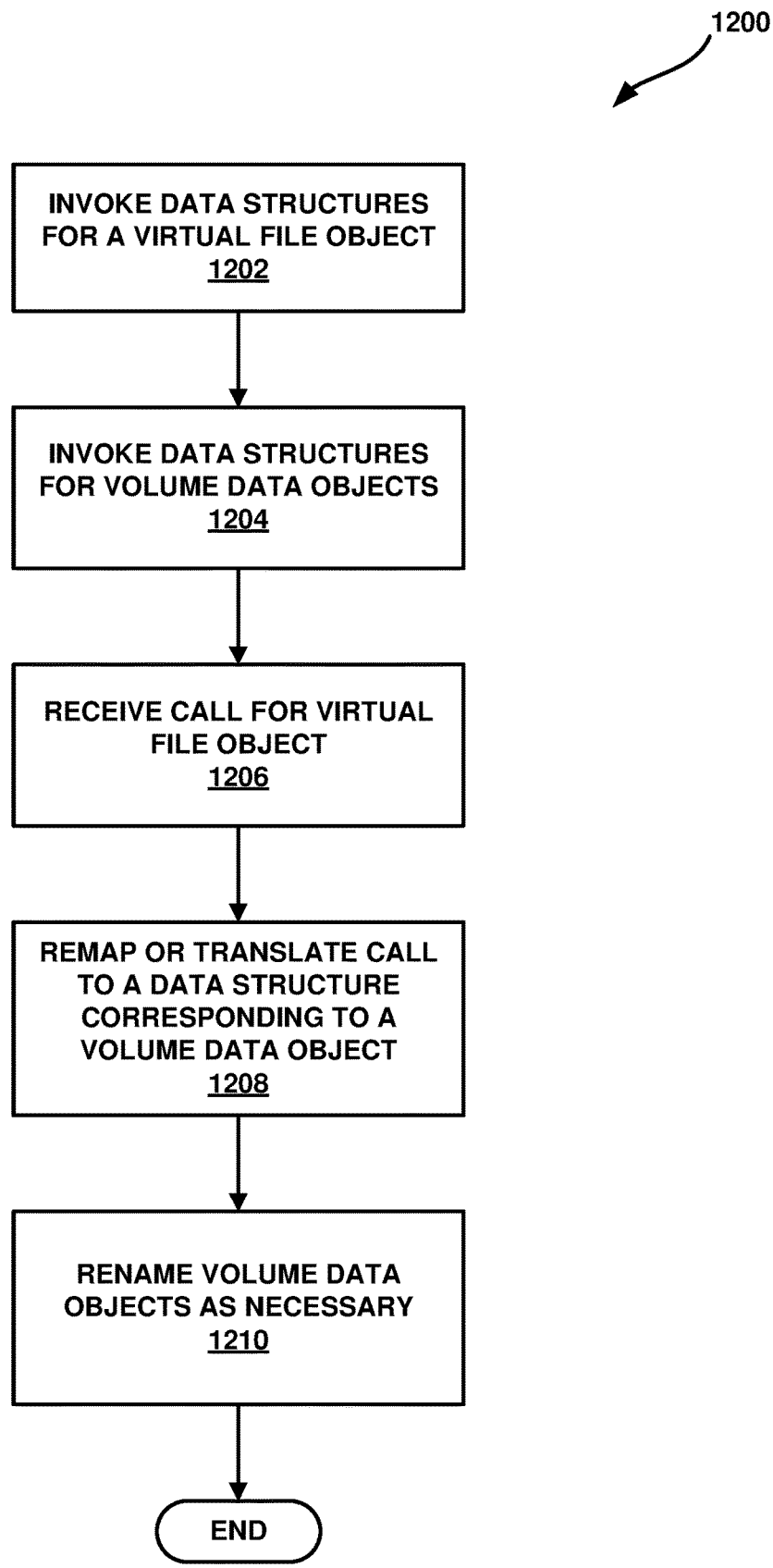
FIG. 12 is a flowchart illustrating an example of handling calls for a large data object according to one or more techniques of this disclosure.

FIG. 12 is a flowchart illustrating an example of handling calls for a large data object according to one or more techniques of this disclosure. The flowchart in FIG. 12 corresponds to the examples described in FIGS. 11A-11B. It should be noted that although flowchart 1200 is described with respect to file system driver 206, the techniques illustrated in FIG. 12 may be performed by computing device 100 and any combination of components thereof. File system driver 206 invokes data structures of a virtual file object (1202). For example, file system driver 206 invokes a file object, an Mode object, and a dentry object for a directory representing a file. File system driver 206 invokes data structures for data object included in a volume (1204). For example, file system driver 206 invokes an Mode and/or a dentry objects for a large file indicator entry, an attribute entry, a size entry and entries for one or more sub-files in the directory. File system driver 206 receives a call for a virtual file object (1206). For example, file system driver 206 receives a read or a write call. File system driver 206 remaps the call, in one example, or translates the call, in one example (1208). As described above, remapping a call includes invoking a higher layer call for a sub-file. As further described above, translating a call includes determining mapping information for a corresponding sub-file without invoking a higher layer call for the sub-file. Based on the nature of the call, file system driver 206 renames an attribute entry and/or a size entry as necessary (1208). In this manner computing device 100 represents an example of a device configured to invoke one or more objects corresponding to a virtual file.

It should be noted that in each of the examples described above with respect to FIGS. 11A-11B, for a given file, processes may include switching sub-files. For example, if a read operation requires data included in two sub-files (e.g., in the example of FIG. 7, reading data offset at 1.8 GiB to 2.1 GiB), switching sub-files may include opening and closing each of the sub-files and performing multiple remapping or translation operations and in some cases may also include caching the data twice (i.e., once in the memory cache of the sub-files themselves and once in the memory cache for the virtual file object). Thus, in one example, according to the techniques described herein, in the case where a file larger than 4 GiB is included in a FAT32 volume and is represented as a directory including a large file indicator entry, an attribute entry, a size entry and entries for one or more sub-files in the directory, filesystem driver 206 may be configured to invoke one or more objects corresponding to a virtual file without presenting the entire contents of the directory representing the large file to the kernel.

In the example illustrated in FIG. 13, file system driver 206 presents MYMOVIE.MP4 to the user-space as a file object and invokes corresponding objects in the kernel and does not invoke objects for the contents of the MYMOVIE.MP4 directory to the kernel. In this manner, file system driver 206 may be said to present the MYMOVIE.MP4 directory as a file externally without exposing the directory contents internally. As illustrated in FIG. 13, file system driver 206 presents MYMOVIE.MP4 to a virtual filesystem using a single dentry object, a single Mode object, and a single address space object. In this case, operations with respect to (MYMOVIE.MP4) may proceed with method calls corresponding to the single dentry object, single Mode object, and single address space object. That is, as illustrated in FIG. 13, processes initiated by a user-space may be handled using calls and methods implemented by filesystem driver 206 without performing remapping or translation operations. As further illustrated in FIG. 13, each of a large file indicator entry, an attribute entry, a size entry, and entries for one or more sub-files may be treated as metadata. In this case, metadata may be updated to track any changes (e.g., the access/last modified times, file size, etc.) resulting from processes initiated by a user-space. File system driver 206 may subsequently update corresponding directory entries on the volume based on the metadata. It should be noted that updating corresponding directory entries on the volume may in most cases be performed in-place (i.e., by overwriting data in a particular cluster).

Figure 14:
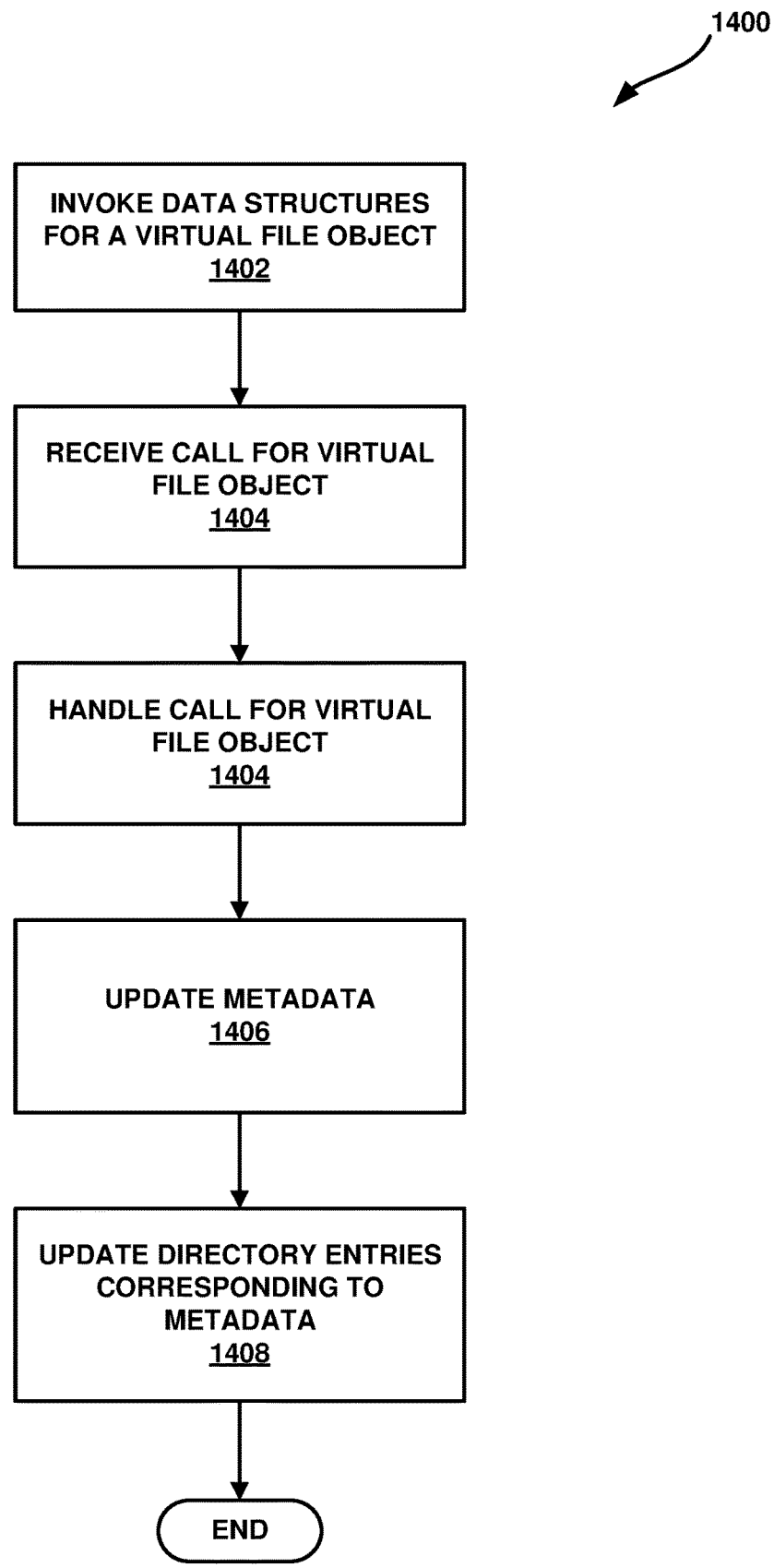
FIG. 14 is a flowchart illustrating an example of handling calls for a large data object according to one or more techniques of this disclosure.

FIG. 14 is a flowchart illustrating an example of handling calls for a large data object according to one or more techniques of this disclosure. The flowchart in FIG. 14 corresponds to the example described in FIG. 13. It should be noted that although flowchart 1400 is described with respect to file system driver 206, the techniques illustrated in FIG. 14 may be performed by computing device 100 and any combination of components thereof. File system driver 206 invokes data structures of a virtual file object (1402). For example, file system driver 206 invokes a file object, an Mode object, a dentry object, and an address space object for a directory representing a file. File system driver 206 receives a call for a virtual file object (1404). For example, file system driver 206 receives a read or a write call. File system driver 206 handles the call for the virtual file object (1404). Based on the nature of the call, file system driver 206 updates metadata (1406). File system driver 206 updates the directory entries corresponding to the metadata (1408). In this manner computing device 100 represents an example of a device configured to invoke one or more objects corresponding to a virtual file.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for handling calls for a directory representation for a file in a file system, the file having a size larger than a maximum file size provided by the file system, the method comprising:
   invoking a virtual file object for the file, wherein the directory representation for the file in the file system includes a hidden system directory having there within:
      a large file indicator entry including a directory entry having a special character string identifying the directory as representing a file, and
      two or more index entries including directory entries identifying cluster chains corresponding to respective sub-files of the file;
   invoking a respective data structure for each of the directory entries included in the hidden system directory;
   receiving a call associated with the virtual file object, wherein the call corresponds to data included in a sub-file of the file; and
   remapping the call to the data structure corresponding to the sub-file including the data.

2. The method of claim 1, wherein the call corresponds to reading the data included in the sub-file and where remapping the call includes invoking a read call for the data structure corresponding to the sub-file.

3. The method of claim 1, wherein the special character string includes A$FT$LGE.F$L.

4. The method of claim 1, wherein the hidden system directory further has there within a size entry including a directory entry having a name in which the characters thereof indicate the size of the file.

5. A method for handling calls for a directory representation for a file in a file system, the file having a size larger than a maximum file size provided by the file system, the method comprising:
   invoking a virtual file object for the file, wherein the directory representation for the file in the file system includes a hidden system directory having there within:

a large file indicator entry including a directory entry having a special character string identifying the directory as representing a file, and two or more index entries including directory entries identifying cluster chains corresponding to respective sub-files of the file;

invoking a respective data structure for each of the directory entries included in the hidden system directory;

receiving a call associated with the virtual file object, wherein the call corresponds to data included in a sub-file of the file; and translating the call to the data structure corresponding to the sub-file including the data.

6. The method of claim 5, wherein the call corresponds to reading the data included in the sub-file and where translating the call includes directly reading the data without invoking a higher layer call for one of the respective data structures by translating the call to an address space corresponding to the sub-file.

7. The method of claim 5, wherein the special character string includes A$FT$LGE.F$L.

8. The method of claim 5, wherein the hidden system directory further has there within a size entry including a directory entry having a name in which the characters thereof indicate the size of the file.

9. A method for handling calls for a directory representation for a file in a file system, the file having a size larger than a maximum file size provided by the file system, the method comprising:

invoking a virtual file object for the file, wherein the directory representation for the file in the file system includes a hidden system directory having there within:

a large file indicator entry including a directory entry having a special character string identifying the directory as representing a file, and two or more index entries including directory entries identifying cluster chains corresponding to respective sub-files of the file;

invoking data structures for the virtual file object without invoking a respective data structure for each of the directory entries included in the hidden system directory and wherein the directory entries are treated as metadata;

receiving a call associated with the virtual file object; handling the call; and updating the directory entries included in the hidden system directory based on the call.

10. The method of claim 9, wherein the special character string includes A$FT$LGE.F$L.

11. The method of claim 9, wherein the hidden system directory further has there within a size entry including a directory entry having a name in which the characters thereof indicate the size of the file.

12. A device comprising one or more processors configured to:

invoke a virtual file object for a file in a file system, the file having a size larger than a maximum file size provided by the file system and having a directory representation including a hidden system directory having there within:

a large file indicator entry including a directory entry having a special character string identifying the directory as representing a file, and two or more index entries including directory entries identifying cluster chains corresponding to respective sub-files of the file;

invoke a respective data structure for each of the directory entries included in the hidden system directory;

receive a call associated with the virtual file object, wherein the call corresponds to data included in a sub-file of the file; and handle the call by performing one of: remapping the call to or translating the call to the data structure corresponding to the sub-file including the data.

13. The device of claim 12, wherein the call corresponds to reading the data included in the sub-file and where remapping the call includes invoking a read call for the data structure corresponding to the sub-file.

14. The device of claim 12, wherein the call corresponds to reading the data included in the sub-file and where translating the call includes directly reading the data without invoking a higher layer call by translating the call to an address space corresponding to the sub-file.

15. The device of claim 12, wherein the special character string includes A$FT$LGE.F$L.

16. A device comprising one or more processors configured to:

invoke a virtual file object for a file in a file system, the file having a size larger than maximum file size provided by the file system and having a directory representation including a hidden system directory having there within:

a large file indicator entry including a directory entry having a special character string identifying the directory as representing a file, and two or more index entries including directory entries identifying cluster chains corresponding to respective sub-files of the file;

invoke data structures for the virtual file object without invoking a respective data structure for each of the directory entries included in the hiddent system directory;

receive a call associated with the virtual file object; handle the call; and updating the directory entries included in the hidden system directory based on the call.

17. The device of claim 16, wherein the special character string includes A$FT$LGE.F$L.

18. A non-transitory computer-readable storage medium comprising instructions stored thereon, that upon execution, cause one or more processors of a device to:

invoke a virtual file object for a file in a file system, the file having a size larger than maximum file size provided by the file system and having a directory representation including a hidden system directory having there within:

a large file indicator entry including a directory entry having a special character string identifying the directory as representing a file, and two or more index entries including directory entries identifying cluster chains corresponding to respective sub-files of the file;

invoke a respective data structure for each of the directory entries included in the hidden system directory;

receive a call associated with the virtual file object, wherein the call corresponds to data included in a sub-file of the file; and handle the call by performing one of: remapping the call to or translating the call to the data structure corresponding to the sub-file including the data.

19. The non-transitory computer-readable storage medium of claim 18, wherein the call corresponds to reading the data included in the sub-file and where remapping the call includes invoking a read call for the data structure corresponding to the sub-file.

20. The non-transitory computer-readable storage medium of claim 18, wherein the call corresponds to reading the data included in the sub-file and where translating the call includes directly reading the data without invoking a higher layer call for by translating the call to an address space corresponding to the sub-file.

21. The non-transitory computer-readable storage medium of claim 18, wherein the special character string includes A$FT$LGE.F$L.

* * * * *